(12) United States Patent
Reynolds et al.

(10) Patent No.: US 6,286,763 B1
(45) Date of Patent: Sep. 11, 2001

(54) METHOD AND APPARATUS TO AUTOMATICALLY SEARCH DATA CARRIERS, SUCH AS RFID TAGS AND MACHINE-READABLE SYMBOLS

(75) Inventors: Andrew E. Reynolds, Bothell; Christopher A. Wiklof, Everett; Daniel B. Bodnar, Duvall, all of WA (US)

(73) Assignee: Intermac IP Corp., Beverly Hills, CA (US)

( * ) Notice: Subject to any disclaimer, the term of this patent is extended or adjusted under 35 U.S.C. 154(b) by 0 days.

(21) Appl. No.: 09/401,365

(22) Filed: Sep. 21, 1999

(51) Int. Cl.[7] ....................................................... G06R 7/10
(52) U.S. Cl. ................................. 235/472.01; 235/472.01
(58) Field of Search ........................... 235/472.01, 472.02

(56) References Cited

U.S. PATENT DOCUMENTS

| | | | |
|---|---|---|---|
| 5,801,371 | * | 9/1998 | Kahn et al. ...................... 235/472.01 |
| 6,027,021 | * | 2/2000 | Kumar ............................. 235/472.01 |
| 6,097,301 | * | 8/2000 | Tuttle ................................. 340/693.9 |
| 6,104,333 | * | 8/2000 | Wood, Jr. ............................. 341/173 |
| 6,127,928 | * | 10/2000 | Issacman ............................ 340/572.1 |

OTHER PUBLICATIONS

Specifying and Installing AMTECH Products, Dallas, Texas, Jun. 6–10, 1988, "The AUX–2 Serial Port", pp. 1, 6, and 7.
Command codes for the AMTECH Model AI–1200 Reader, Versions 2.1, 2.2 and 2.30, Oct. 11, 1988, pp. 1 and 33.
Amtech Corporation Product Catalog 1194, Readers, 1994, pp. 1–10, 1–11, 1–20, and 1–21.

* cited by examiner

Primary Examiner—Harold I. Pitts
(74) Attorney, Agent, or Firm—Seed IP Law Group PLLC

(57) ABSTRACT

A data carrier reader is capable of executing a number of different reading methods. A method for reading single RFID tags can store read data to a buffer for eventual transmission to a host, and can suppress redundant data. Still another method associates data read from an RFID tag with a particular object or item using a data coded in a machine-readable symbol. In a further method, the machine-readable symbol is automatically read when the RFID tag is within a predetermined proximity of the reader. In each method, the data carrier reader provides the user a consistent and intuitive output to identify the successful and unsuccessful operations such as reading an RFID tag or machine-readable symbol.

14 Claims, 15 Drawing Sheets

| STATUS OR ERROR INDICATION | SCANNER/RFID READER LED INDICATOR(S)* | SCANNER AUDIO INDICATOR | 1555 LASER SPOT | SCANNER LCD MESSAGE | PDT/HOST MESSAGE | DATA AND/OR ERROR CODE SENT TO HOST |
|---|---|---|---|---|---|---|
| NO SCANNING OR RFID READING | NONE | NONE | OFF | NONE | NONE | NONE |
| ATTEMPT RFID READ OR WRITE OF TAGS | YELLOW RFID & POWER LED ON UNTIL SUCCESSFUL READ OR RELEASE OF TRIGGER | NONE | LASER SPOT FLASHING ON/OFF WHEN READING | GOOD READ 0 | NONE | NONE |
| INTERROGATION TOO FAST (UNSUCCESSFUL INTERROGATION) | FLASHING YELLOW RFID LED UNTIL VALID RFID DECODES OR UNTIL TRIGGER IS OFF | CONTINUOUS "CLICKS" | LASER SPOT SOLID ON | "SCANNING TOO FAST" | "SCANNING TOO FAST" | NONE |
| BAR CODE SCANNING | YELLOW POWER LED ON UNTIL SUCCESSFUL DECODE OR RELEASE OF TRIGGER | NONE | OFF IN DEFAULT BUT CAN BE PROGRAMMED ON AND SET FOR SPECIFIED DURATION | NONE | NONE | NONE |
| BAR CODE SUCCESSFUL DECODE | GREEN BAR CODE LED ON FOR 5 SECONDS OR NEXT TRIGGER PULL, YELLOW POWER LED OFF | ONE BEEP | OFF | DISPLAY DATA | DISPLAY DATA | DATA |

Fig. 5A

| STATUS OR ERROR INDICATION | SCANNER/RFID READER LED INDICATOR(S)* | SCANNER AUDIO INDICATOR | 1555 LASER SPOT | SCANNER LCD MESSAGE | PDT/HOST MESSAGE | DATA AND/OR ERROR CODE SENT TO HOST |
|---|---|---|---|---|---|---|
| GOOD READ & WRITE GOOD READ AND WRITE TO SINGLE, GROUP OR ANY TAG (LOCAL) | QUICK FLASHING GREEN RFID ON READING AND WRITING READS EQUALS WRITES AND TURN GREEN RFID LED ON SOLID FOR 5 SECONDS OR NEXT TRIGGER PULL | "CLICK" EACH GOOD READ & WRITE AND BEEPS WHEN READS EQUALS WRITES | LASER SPOT BLINKS ON/OFF WHEN IN RANGE AND ON SOLID WHEN OUT OF RANGE UNTIL READS EQUAL WRITES | GOOD WRITE X OF N | GOOD WRITE X OF N | SEND SERIAL NUMBER OF EACH TAG, AFTER WRITE RESPOND BACK WITH SERIAL NUMBER OF TAGS WRITTEN |
| INCOMPLETE READ/WRITE INCOMPLETE READ/WRITE TO SINGLE, GROUP OR ANY TAG | QUICK FLASHING GREEN RFID UNTIL ABORT AFTER 10 WRITE ATTEMPTS ON ANY TAG AND TURN YELLOW RFID LED ON FOR 5 SECONDS OR NEXT TRIGGER PULL | "CLICK" EACH GOOD READ & WRITE AND TRIPLE BEEP IF ABORT AFTER 10 WRITE ATTEMPTS ON ANY TAG | LASER SPOT BLINKS ON/OFF WHEN IN RANGE AND ON SOLID WHEN OUT OF RANGE OR UNTIL ABORT | GOOD WRITE X OF N | GOOD WRITE X OF N | SEND SERIAL NUMBER OF EACH TAG, AND TOTAL NUMBER OF TAGS IN FIELD |
| ATTEMPTED WRITE TO LOCKED TAG | FLASHING YELLOW RFID LED FOR 5 SECONDS OR UNTIL NEXT TRIGGER PULL | THREE BEEPS | LASER SPOT BLINKS ON/OFF WHEN IN RANGE AND ON SOLID WHEN OUT OF RANGE UNTIL LOCKED TAG DETECTED | X TAGS LOCKED-ERROR | X TAGS LOCKED-ERROR | TAG REQUIRED ACCESS OR POLLING CODE NOT AVAILABLE OR INCORRECT |

Fig. 5B

| STATUS OR ERROR INDICATION 31 | SCANNER/RFID READER LED INDICATOR(S)* 33 | SCANNER AUDIO INDICATOR 35 | 1555 LASER SPOT 37 | SCANNER LCD MESSAGE 39 | PDT/HOST MESSAGE 41 | DATA AND/OR ERROR CODE SENT TO HOST 43 |
|---|---|---|---|---|---|---|
| SEARCH FOR MATCHES SEARCH FOR MATCHES WHERE TRIGGER BECOMES ON/OFF TOGGLE SWITCH, i.e., FIRST TRIGGER ACTIVATION TURNS ON AND SECOND TRIGGER ACTIVATION TURNS OFF. | YELLOW LED FLASH ON NON-MATCH. QUICK GREEN FLASHING LED TO EVERY MATCH. HOST PROVIDED SORT TABLE. HOST OR BAR CODE PROGRAMMABLE FOR MATCH OR EXCEPTION. | "CLICK" FOR EACH NON-MATCH AND BEEP FOR EACH MATCH. BEEPER SET TO DEFAULT. | LASER SPOT BLINKS ON/OFF WHEN IN RANGE AND ON SOLID WHEN OUT OF RANGE. FLASHES FASTER WHEN FINDS A MATCH. | "SEARCHING" FLASHING UNTIL "MATCH" ON TOP LINE OF LCD W/ HISTOGRAM SHOWING NUMBER OF NEW READS. | DISPLAY MATCHED DATA. | TRANSFER LIST FROM HOST, TRANSFER MATCHING DATA STRINGS TO HOST. |
| BUFFER FULL THIS STATUS APPLIES TO AN APPLICATION WHERE THE HAND HELD'S BUFFER BECOMES FULL WITH TAG DATA, FOR EXAMPLE, IN AN INVENTORY OPERATION WHERE A USER CONTINUOUSLY SCANS TAG DATA INTO THE HAND HELD. THE HAND HELD WILL BE UNTETHERED. | YELLOW LED SOLID FOR 5 SECONDS OR UNTIL NEXT USER ENTRY. | TRIPLE BEEP UPON ANY ATTEMPT TO ADD MORE DATA TO THE BUFFER UNTIL IT HAS BEEN UPLOADED OR RESET. | NONE | BUFFER FULL | N/A | TRANSFER DATA FROM BUFFER TO HOST. |

Fig. 5C

METHOD AND APPARATUS TO AUTOMATICALLY SEARCH DATA CARRIERS, SUCH AS RFID TAGS AND MACHINE-READABLE SYMBOLS

TECHNICAL FIELD

This application relates to methods and apparatus for reading data carriers such as machine-readable symbols (e.g., barcode symbols, area and/or matrix code symbols) and wireless memory devices (e.g., RFID tags).

BACKGROUND OF THE INVENTION

A variety of methods exist for tracking and providing information about items. For example, inventory items typically carry printed labels providing information such as serial numbers, price, weight, and size. Some labels include data carriers in the form of machine-readable symbols that can be selected from a variety of machine-readable symbologies, such as bar code, and/or area or matrix code symbologies. The amount of information that the symbols can contain is limited by the space constraints of the label. Updating the information in these machine-readable symbols typically requires the printing of a new label to replace the old label.

Data carriers such as memory devices provide an alternative method for tracking and providing information about items. Memory devices permit the linking of large amounts of data with an object or item. Memory devices typically include a memory and logic in the form of an integrated circuit ("IC") and means for transmitting data to and/or from the device. For example, a radio frequency identification ("RFID") tag typically includes a memory for storing data, an antenna, an RF transmitter, and/or an RF receiver to transmit data, and logic for controlling the various components of the memory device. RFID tags are generally formed on a substrate and can include, for example, analog RF circuits and digital logic and memory circuits. The RFID tags can also include a number of discrete components, such as capacitors, transistors, and diodes.

RFID tags can be passive, active or hybrid devices. Active devices are self-powered, by a battery for example. Passive devices do not contain a discrete power source, but derive their energy from an RF signal used to interrogate the RFID tag. Passive RFID tags usually include an analog circuit that detects and decodes the interrogating RF signal and that provides power from the RF field to a digital circuit in the tag. The digital circuit generally executes all of the data functions of the RFID tag, such as retrieving stored data from memory and causing the analog circuit to modulate the RF signal to transmit the retrieved data. In addition to retrieving and transmitting data previously stored in the memory, the RFID tag can permit new or additional information to be stored in the RFID tag's memory, or can permit the RFID tag to manipulate data or perform some additional functions. RFID tags are available from a number of manufacturers, including Texas Instruments, Dallas, Tex., and Omron of Japan.

Another form of memory device is an optical tag. Optical tags are similar in many respects to RFID tags, but rely on an optical signal to transmit data to and/or from the tag.

Additionally, touch memory data carriers are available, for example touch memory devices from Dallas Semiconductor of Dallas, Tex. Touch memory devices are similar to RFID tags but require physical contact with to store and retrieve data.

A user typically secures a data carrier to an item, such as a good, product, or container by way of a pressure sensitive adhesive. The data carrier often encodes information specifically relating to the item such as identifying or destination information. An individual, such as a checkout or inventory clerk, can retrieve data about any given item, for example, by scanning the machine-readable symbol or interrogating the RF tag, optical tag, or touch memory device. Access to the data can be useful at the point of sale, during inventory, during transportation, or at other points in the manufacture, distribution, sale, or use of the tagged item.

Relatively high cost is one of the drawbacks of memory devices, thus, many applications rely on the less expensive printed machine-readable symbols. Another significant drawback is the difficulty of identifying a particular memory device from a group of memory devices. It is particularly difficult to associate the information read from the RFID tag with a physical item or container. The ability to read data from different types of data carriers, for example machine-readable symbols and RFID tags, and/or to associate and manipulate such data can provide numerous benefits in the automatic data collection ("ADC") industry.

SUMMARY OF THE INVENTION

In one aspect a data carrier reader includes an RFID tag reading section and a machine-readable symbol reading section, which can contain some common components. The reader is operable in an RFID tag reading mode and/or a symbol reading mode. The reader provides a consistent and intuitive user interface within, and between, the operating modes. The user interface can include visual, aural and tactile indicators. The visual indicators can include a pattern displayed by indicators on the reader, or projected onto or near the data carrier.

In another aspect, a data carrier reader is capable of executing a number of different reading methods. A method for reading single RFID tags can store read data to a buffer for eventual transmission to a host, and can suppress redundant data. Another method identifies all RFID tags having a characteristic data string that appears on a list. In contrast, another method identifies any RFID tags having a characteristic data string that does not appear on the list. Still another method associates data read from an RFID tag with a particular object or item using a data coded in a machine-readable symbol. In a further method, the machine-readable symbol is automatically read when the RFID tag is within a predetermined proximity of the reader. In each method, a consistent and intuitive output can be provided to the user to identify the successful and unsuccessful operations such as reading an RFID tag or machine-readable symbol.

BRIEF DESCRIPTION OF THE DRAWINGS

In the drawings, identical reference numbers identify similar elements or acts. The sizes and relative positions of elements in the drawings are not necessarily drawn to scale. For example, various elements may be arbitrarily enlarged and positioned to improve drawing legibility.

FIGS. 5A–5C together form a chart of selected input and output signals for operating the reader of FIG. 2 and the visual indicators of FIG. 4.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with RFID tags, RFID tag readers, one- and two-dimensional symbologies, symbol readers, microprocessors and communication networks have not been shown or described in detail to avoid unnecessarily obscuring descriptions of the embodiments of the invention.

The headings provided herein are for convenience only and do not interpret the scope or meaning of the claimed invention.

Data Carrier Reader

Figure 1:
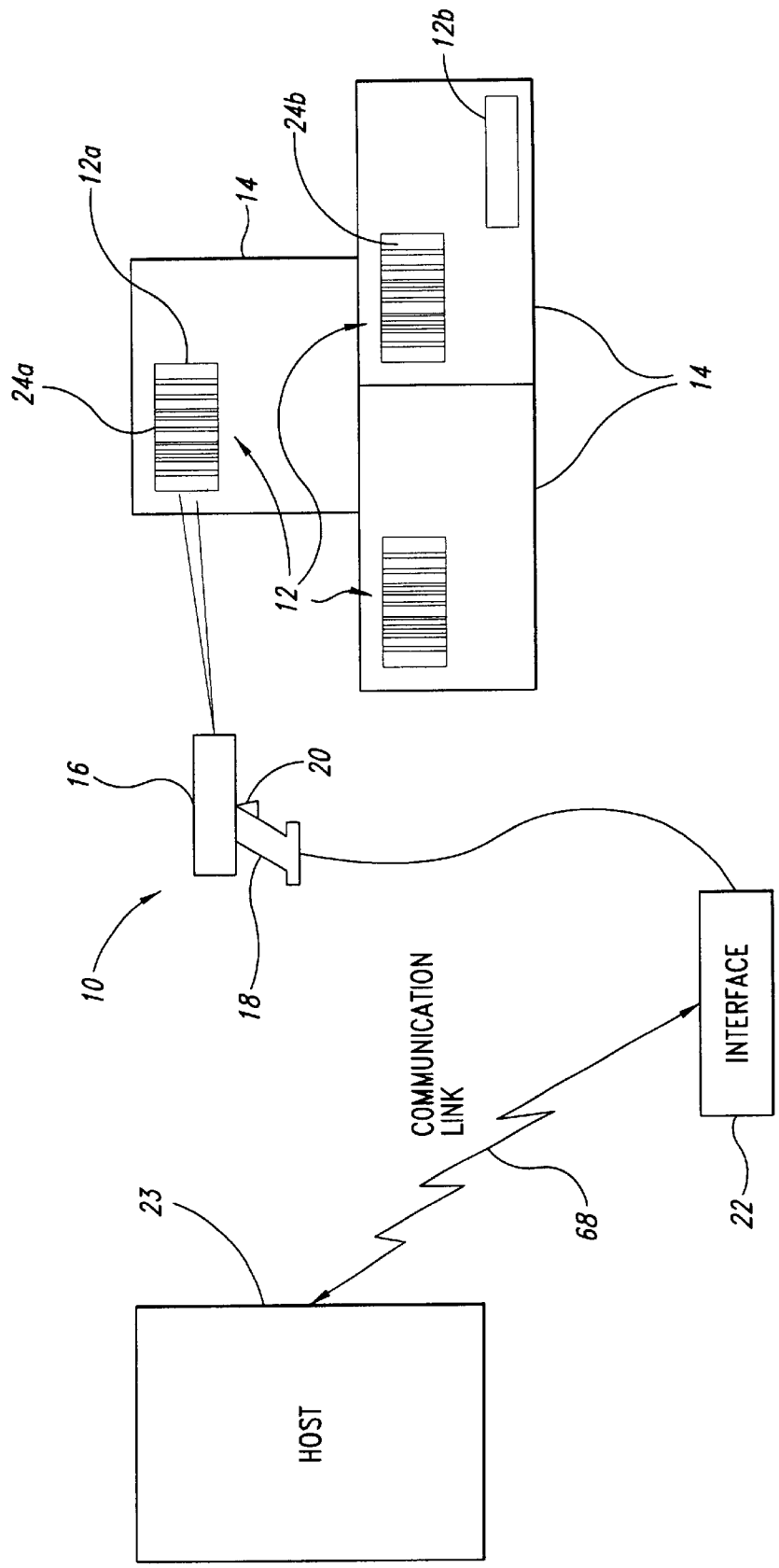
FIG. 1 is a partial block diagram, partial front elevational view of a facility including a data carrier reader reading data carriers carried by a number of items, the reader communicate with a host through an interface.

FIG. 1 shows a data carrier reader 10 reading one or more of a number of data carriers, such as the RFID tags 12 on the containers or items 14. The reader 10 includes a head 16, a handle 18 and a trigger 20. An interface 22 can couple the reader 10 to a host 23, such as a centralized computer, as described in detail below.

The tags 12 can take the form of an RFID tag 12A that carries a machine-readable symbol 24A on a visible surface of the tag. Alternatively, the tags 12 can take the form of a separate RFID tag 12B and machine-readable symbol 24B. The separate RFID tag 12B and machine-readable symbol 24B can be physically associated, for example, securing each to the same physical object, such as the item 14. The RFID tag 12A, 12B and machine-readable symbol 24A, 24B can contain logically associated information, for example information related to the item 14 to which the tags 12 are secured, such as identifying and/or shipping information.

Figure 2:
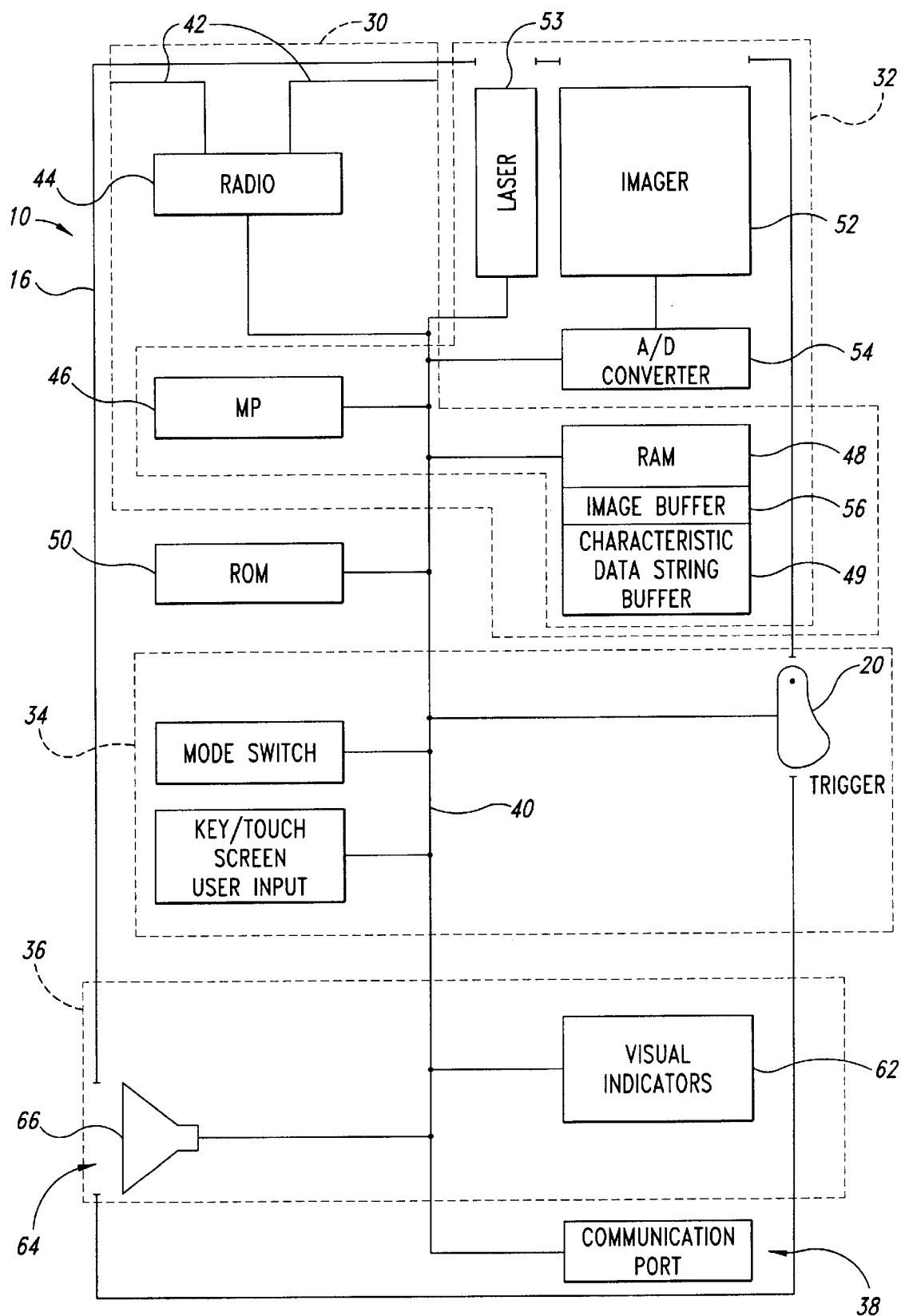
FIG. 2 is a functional block diagram of the reader according to one embodiment of the invention.

As shown in FIG. 2, the reader 10 contains an RFID tag reading section 30, a symbol reading section 32, a user input section 34, a user output section 36, and a communications section 38 all coupled by a bus 40. The bus 40 provides data, commands and/or power to the various sections 30–38. The reader 10 can include an internal power source such as a rechargeable battery (not shown) or can receive power from an external power source such as a wall outlet by way of an electrical cord (not shown). Each of these sections 30–38 will be described individually below, although in the illustrated embodiment some of these sections share common components.

RFID Tag Reading Section

FIG. 2 shows the RFID tag reading section 30 of the data carrier reader 10 including an antenna 42 coupled to a radio 44. The radio 44 is coupled via the bus 40 to a microprocessor 46 and a random access memory ("RAM") 48. The RAM 48 can include a characteristic data string buffer 49 to temporarily store characteristic data strings, as will be explained in detail below. Alternatively, the reader 10 can include a discrete characteristic data string buffer (not shown). While FIG. 2 shows a single microprocessor 46, the data carrier reader 10 may include separate dedicated processors for each of the RFID tag and symbol reading sections 30, 32.

While a dipole antenna 42 is shown, the data carrier reader 10 can employ other antenna designs. Of course, the antenna can be selected to achieve a particular focus, for example, a highly directional antenna can enhance the ability of the reader 10 to select a single RFID tag 12 out of a group of RFID tags. The radio 44 can take the form of a transceiver capable of transmitting and receiving at one or more of the frequencies commonly associated with RFID tags 12 (e.g., 350 kilohertz, 400 kilohertz, 900 kilohertz). While these frequencies typically fall within the radio frequency range of the electromagnetic spectrum, the radio 44 can successfully employ frequencies in other portions of the spectrum. Antenna design and radios are generally discussed in *The ARRL Handbook for Radio Amateurs*, $76^{th}$ Ed., American Radio Relay League, Newington, Conn., U.S.A. (1999) (ISBN: 0-87259-181-6), and commonly assigned patent application U.S. Ser. No. 09/280,287, filed Mar. 29, 1999, entitled ANTENNA STRUCTURES FOR WIRELESS COMMUNICATIONS DEVICE, SUCH AS RFID TAG (Atty. Docket No. 480062.648).

A read only memory ("ROM") 50 stores instructions for execution by the microprocessor 46 to operate the radio 44. As used in this herein, ROM includes any non-volatile memory, including erasable memories such as EEPROMs. The programmed microprocessor 46 can control the radio 44 to emit an interrogation signal, including any required polling codes or encryption, and to receive a return signal from an RFID tag 12A, 12B. The programmed microprocessor 46, RAM 48, radio 44 and antenna 42 thus form the RFID reading section 30.

Symbol Reading Section

FIG. 2 also shows the symbol reading section 32 of the data carrier reader 10 including an image sensor 52 and an illumination source, such as the laser 53. The image sensor 52 can take the form of a one- or two-dimensional charge coupled device ("CCD") array. Alternatively, the reader 10 can employ other known imaging devices, for example laser scanners or Vidicons. In certain embodiments, the data carrier reader 10 can omit the illumination source, for example where the image sensor 52 is a two-dimensional CCD array operable with ambient light. Alternatively, the data carrier reader 10 can rely on other illumination sources, such as light emitting diodes ("LEDs") or a strobe light, that can be positioned to illuminate a desired one of the machine-readable symbols 24A, 24B. The reader 10 can employ suitable optics such as lens and mirrors (not shown) for directing light reflected from the machine-readable symbol 24A, 24B to the image sensor 52.

The reader 10 includes an analog-to-digital ("A/D") converter 54, to transform the analog electrical signals from the image sensor 52 into digital signals for use by the microprocessor 46. The bus 40 couples the image data from the A/D converter 54 to the microprocessor 46 and the RAM 48. A portion of the RAM 48 can form an image buffer 56 for temporarily storing data, such as a captured image data from the image sensor 52. The ROM 50 contains instructions for the microprocessor 46, that permit the microprocessor 46 to control the image sensor 52 to capture image data and to decode and/or manipulate the captured image data. The programmed microprocessor 46, RAM 48, image sensor 52, and A/D converter 54, thus form the symbol reading section 32.

Symbol reading and decoding technology is well-known in the art and will not be discussed in further detail. Many alternatives for image sensors, symbol decoders, and optical elements that can be used in the reader 10 are taught in the book, *The Bar Code Book*, Third Edition, by Roger C. Palmer, Helmers Publishing, Inc., Peterborough, N.H., U.S.A. (1995) (ISBN 0-911261-09-5).

Communications Section

The communications section 38 includes a communications buffer 47 and a communications port 49. The communications buffer 47 can temporarily store incoming and outgoing data and/or commands where the communications speed of the reader 10 does not match the communications speed of some external device, such as the interface 22 (FIG. 1). The communications port 49 provides communications between the reader and external devices. While shown as a hardwire connection to the interface 22 (FIG. 1), the communications port can be a wireless interface, and can even employ the antenna 42 and radio 44 of the RFID tag reading section 30. Additionally, the reader 10 can include the interface 22 as an integral part of the reader 10.

The interface 22 (FIG. 1) can provide communications over a communications network 68 to the host 23, allowing transmissions of data and/or commands between the reader 10 and the host 23. The communications network 68 can take the form of a wired network, for example a local area network ("LAN") (e.g., Ethernet, Token Ring), a wide area network ("WAN"), the Internet, or the World Wide Web ("WWW"). Alternatively or additionally, the communications network 68 can be a wireless network, for example, employing infrared ("IR"), satellite, and/or radio frequency ("RF") communications.

The host 23 can receive from each of a number of the readers 10, data collected from the RFID tags 12 and machine-readable symbols 24. The host 23 can use the data with a database, and can automatically manipulate the data, for example to automatically performing inventory or to track shipments.

The host 23 can provide data and commands to each of a number of the readers 10. For example, the host can share data between the readers 10, such as providing a list of either located or missing identifiers, as will be discussed in more detail below in reference to inclusive and exclusive searches. The host 23 can provide a command to toggle the reader 10 between an RFID tag reading mode and a symbol reading mode, which is described below in further detail. Thus, the host 23 can command, coordinate and share data between a number of readers 10. Commonly assigned patent application U.S. patent application Ser. No. 09/401,066, filed Sep. 22, 1999, entitled, "SYSTEM AND METHOD FOR AUTOMATICALLY CONTROLLING OR CONFIGURING A DEVICE, SUCH AS AN RFID READER" contains teachings that can be used to automatically control or configure the reader 10.

User Input Section

The user input section 34 includes the trigger 20, the mode switch 34, and can include a user input device 58. The bus 40 couples the mode switch 34 to the microprocessor 46. In response to selection of the mode switch 34, the microprocessor 46 switches between the symbol reading mode and the RFID tag reading mode, for example by toggling between the two operating modes. The reader 10 can employ additional operating modes, or switching positions as desired, for example a switch position that places the reader 10 in an OFF state or a WAIT state to conserve energy.

In the symbol reading mode, the microprocessor 46 operates the image sensor 52 to image one of the machine-readable symbols 24A, 24B. The microprocessor 46 decodes the imaged symbol to retrieve the data encoded in the machine-readable symbol 24A, 24B, such as a respective identifier. In the RFID tag reading mode, the microprocessor 46 operates the radio 44 to emit an interrogation signal and to receive a response from one or more of the RFID tags 12A, 12B to the interrogation signal. The microprocessor 46 decodes the response signal to retrieve the data encoded in the RFID tag 12A, 12B, such as a respective identifier.

The mode switch 34 can be a membrane switch, mounted to the exterior of the reader 10 for easy selection by the user. The mode switch 34 can additionally, or alternatively, be implemented in the software to supplement or replace the user selectable mode switch on the exterior of the reader 10. The software implemented switch is particularly useful where the host 23 (FIG. 1) controls the operating mode of the reader 10. Alternatively, the mode switch 34 can be implemented as an icon on a touch sensitive display 74. In further alternatives, the trigger 20 can function as the mode switch 37. In one instance, the number of successive trigger pulls or activations can determine the operating mode. For example, two successive trigger pulls can select the symbol mode, while three successive trigger pulls selects the RFID mode; or a single trigger pull can cause the reader 10 to read a symbol while a double trigger pull toggles between the symbol and RFID modes. Alternatively, the duration of trigger activation can determine the operating mode. For example, a trigger pull of under 0.5 seconds can select the symbol mode, while a trigger pull of longer than 0.5 seconds can select the RFID mode; or a trigger pull of under 0.5 seconds can cause the reader 10 to read a symbol while a trigger pull of over 0.5 seconds toggles the reader between the symbol and RFID modes. Additionally, or alternatively, the mode switch can be context sensitive, switching modes based on data read from a previously read data carrier 12A, 12B, 24A, 24B. For example, a previously read RFID tag 12A can indicate the existence of a symbol 24A. In response, the data carrier reader 10 can automatically switch into symbol mode and read the symbol 24A associated with the RFID tag 12A.

The bus 40 also couples the trigger 20 to the microprocessor 46. In response to activation of the trigger 20, the microprocessor 46 can cause the image sensor 52 to image one of the machine-readable symbols 24A, 24B when the reader 10 is operating in the symbol reading mode. In at least one embodiment, the microprocessor 46 can also cause the radio 44 and antenna 42 to emit an interrogation signal in response to the activation of the trigger 20 while in the reader 10 is operating in the RFID tag reading mode.

The user input device 58 can take the form of a keypad 60 (FIG. 3), mouse, touch screen and/or other user operable device to input information and/or commands to the reader 10. The bus 40 couples the user input device 58 to the microprocessor 46, to allow the user to enter data and commands.

User Output Section

The user output section 36 includes human-perceptible visual and audio indicators 62, 64 respectively. The bus 40 couples the visual and audio indicators 62, 64 to the microprocessor 46 for control thereby. The visual indicators 62 can take a variety of forms, for example: light emitting diodes ("LEDs"); a graphic display such as a liquid crystal display ("LCD"), and/or an alpha-numeric display such as a 7-segment display. The audio indicator 64 can take the form of one or more dynamic, electrostatic or piezo-electric speakers 66. The speaker 66 is operable to produce a variety of sounds (e.g., Clicks and Beeps), and/or frequencies (e.g., tones), and to operate at different volumes. The reader 10 can also include tactile indicators such as a vibrating member. The specific operation of the user output section 36 is discussed in more detail below.

Figure 3:
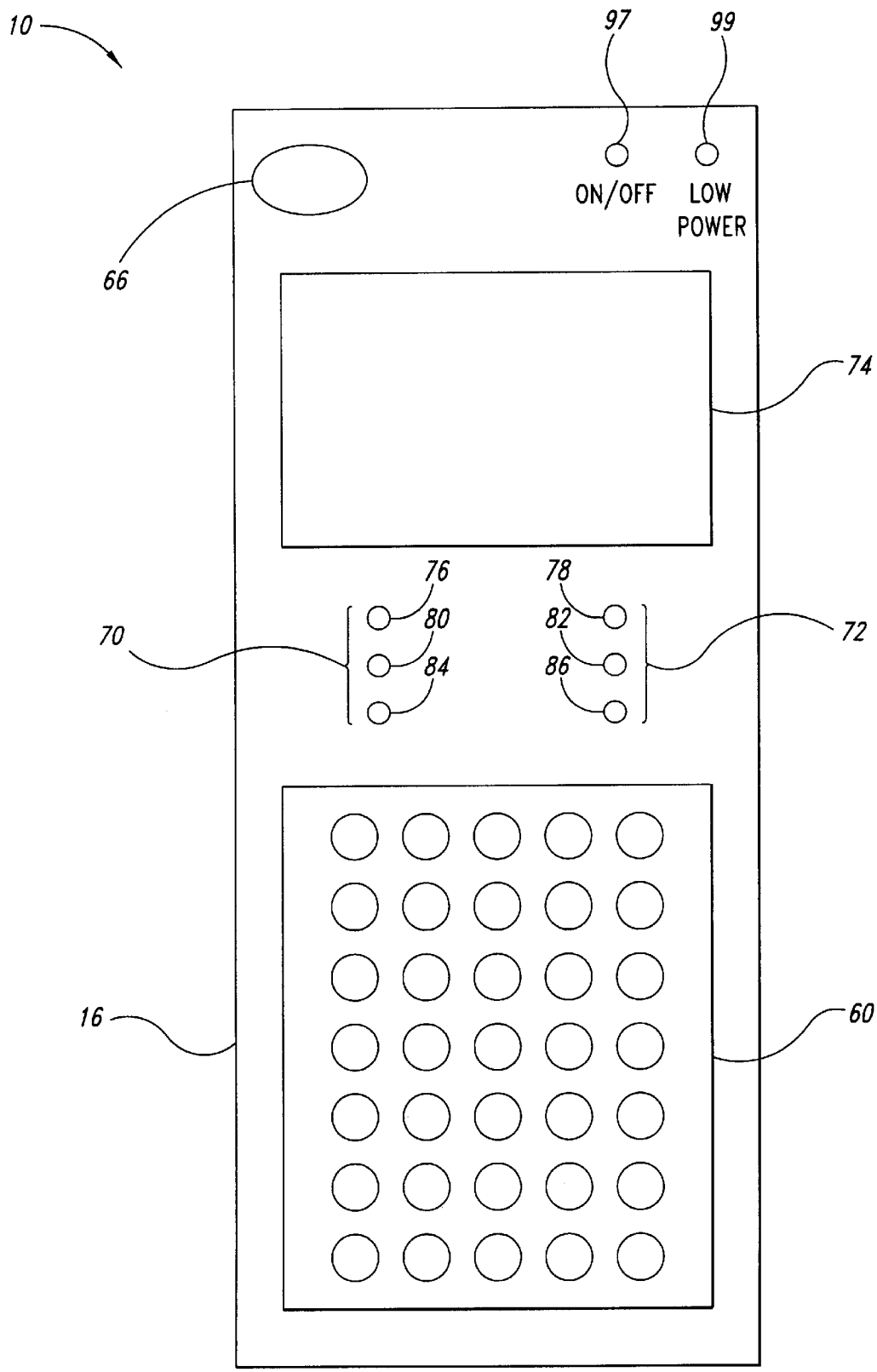
FIG. 3 is a top plan view of the reader of FIG. 2.

FIG. 3 shows a portion of the user interface located on the head 16 of the reader 10. The user interface includes the elements of the user input section 34, such as the trigger 20, the mode switch 34 and the keypad 60. The user interface also includes the elements of the user output section 36 including the visual indicators 63 and the speaker 66. In particular, the visual indicators 62 in the illustrated embodiment include a set of RFID related LEDs 70, a set of machine-readable symbol related LEDs 72, and a display 74.

The data carrier reader 10 can additionally, or alternatively, employ the laser 53 as the visual indicator. The laser can be successively pulsed or flashed according to a set of predefined human-recognizable temporal patterns to provide information to the user, such as user indications corresponding to the various reader operations and/or the responses from the date carriers 12A, 12B, 24A, 24B. Employing the laser 53 as a portion of the user interface provides a number of distinct benefits. For example, operating the laser 53 to provide human-recognizable patterns can eliminate the need for other visual indicators 62. The data carrier reader 10 can employ multiple illumination sources such as lasers 53 or LEDs of different colors, or an illumination source capable of producing a number of different colors to provide the appropriate user indications, as set out in FIGS. 5A–5C. As discussed in detail below, the human-recognizable patterns can take the form of a predefined sequence of laser flashes of one or more colors, separated by time (i.e., temporal pattern).

The visual and audio indicators 62, 64 are configured to provide an intuitive user interface consistent across the RFID tag and symbol reading modes. For example, the RFID tag related and symbol related LED sets 70, 72 each contain green 76, 78, yellow 80, 82 and red 84, 86 LEDs, in an order or pattern that is consistent between the sets. The particular LED 76–86, as well as the number and/or pattern of flashes, is set such that the same color LEDs flash the same pattern for analogous RF tag reading and symbol reading activities. For example, the yellow LED 80 in the RFID tag related set 70 flashes during the reading of one of the RFID tags 12A, 12B (FIG. 1), while the yellow LED 82 in the machine-readable symbol related set 72 flashes during the reading of one of the machine-readable symbols 24A, 24B (FIG. 1). The reader 10 responds to a successful read of the RFID tag 12A, 12B or machine-readable symbol 24A, 24B by illuminating the corresponding green LED 76, 78, respectively, for a set period of time such as 5 seconds. The red LEDs 84, 86 can indicate unsuccessful or incomplete operations. The user receives visual feedback, where the color, position and sequence of the visual indicators 62 is consistent within, and across the RFID tag and symbol operating modes. Consistent feedback can reduce training time and costs, and can lead to more efficient operation of the reader 10.

Similar to the visual indicators 62, the speaker 66 provides consistent feedback within and across the operating modes. In the illustrated embodiment, the speaker 66 emits a "beep" or a "click" sound, although the speaker 66 can emit different and/or additional sounds. The speaker 66 can emit, for example, a single beep each time either an RFID tag 12A, 12B or a machine-readable symbol 24A, 24B is successfully read. When searching a field of RFID tags 12A, 12B for one or more particular tags, the speaker 66 can emit a click for each non-match and a beep for each match.

The user interface can also include an ON/OFF indicator 97, and/or a Low Power indicator 99 to identify the operating condition of the reader 10.

Figure 4:
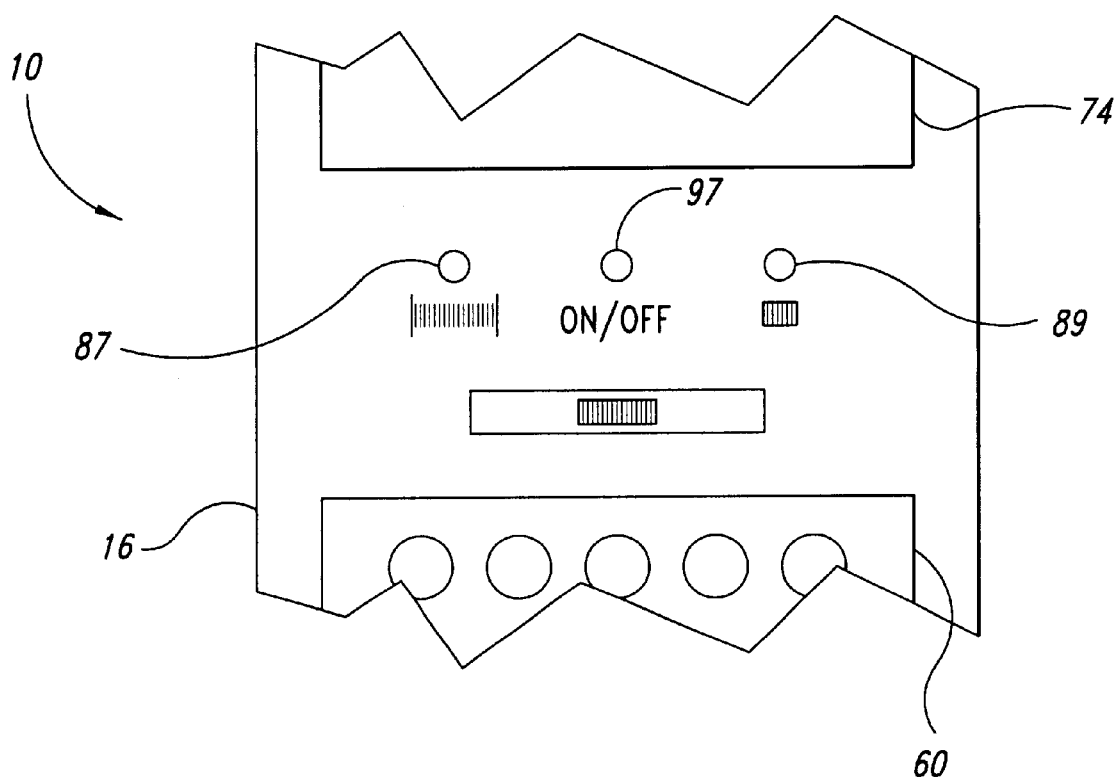
FIG. 4 is a partial top plan view of an alternative set of visual indicators for the reader of FIG. 2.

FIG. 4 shows an alternative set of visual indicators for the reader 10. This alternative embodiment, and those alternative embodiments and other alternatives described herein, are substantially similar to previously described embodiments, and common acts and structures are identified by the same reference numbers. Only significant differences in operation and structure are described in detail below.

The reader 10 of FIG. 4 employs only three LEDs to simplify switching while providing the human-perceptible visual indications. A two state LED serves as the machine-readable symbol related indicator 87. The machine-readable symbol indicator 87 produces no light in an OFF state and a Green light in an ON state. A three state LED serves as the RFID related indicator 89. The RFID related indicator 89 produces a Green light in first ON state, a Yellow light in second ON state, and NO light in an OFF state. A two state LED serves as the ON/OFF indicator 97. The ON/OFF indicator produces a Yellow light, or No light. The ON/OFF indicator is proximate the machine-readable symbol related and RFID related indicators 87, 89. In FIG. 4, the mode switch 34 takes the form of a toggle or slider switch, having a neutral position (center), a symbol mode position (left of center) and an RFID mode position (right of center). The positions are consistent with the corresponding visual indicators 87, 89, respectively.

FIGS. 5A–C describe a variety of input and outputs signals for the reader 10, and particularly for the audio indicator 64 and laser 53 of FIG. 2, and for the visual indicators 87, 89, 97 of FIG. 4. While the table is self-explanatory, a brief description of the columns follows. Column 31 defines a reader status or error conditions corresponding to reader activities. Column 33 describes the operation of the visual indicators 87, 89, 97 of FIG. 4, in response to the various reader status or errors conditions. Similarly, column 35 describes the operation of the audio indicator 64 in response to the various reader status or error conditions 33. Column 37 describes the operation of the laser to produce the desired human-recognizable patterns corresponding to the various reader status or errors conditions 31. Column 39 describes messages for display on the display 74 corresponding to the various reader status or errors conditions 31. Column 41 describes PDT/Host messages corresponding to the various reader status or errors conditions 31. Column 43 describes data and/or error codes sent to the host 33, corresponding the various reader status or errors conditions 31. As discussed above, these user indications provide a consistent interface for the user within and across the operating modes, permitting the user to efficiently operate the reader 10.

Figure 6:
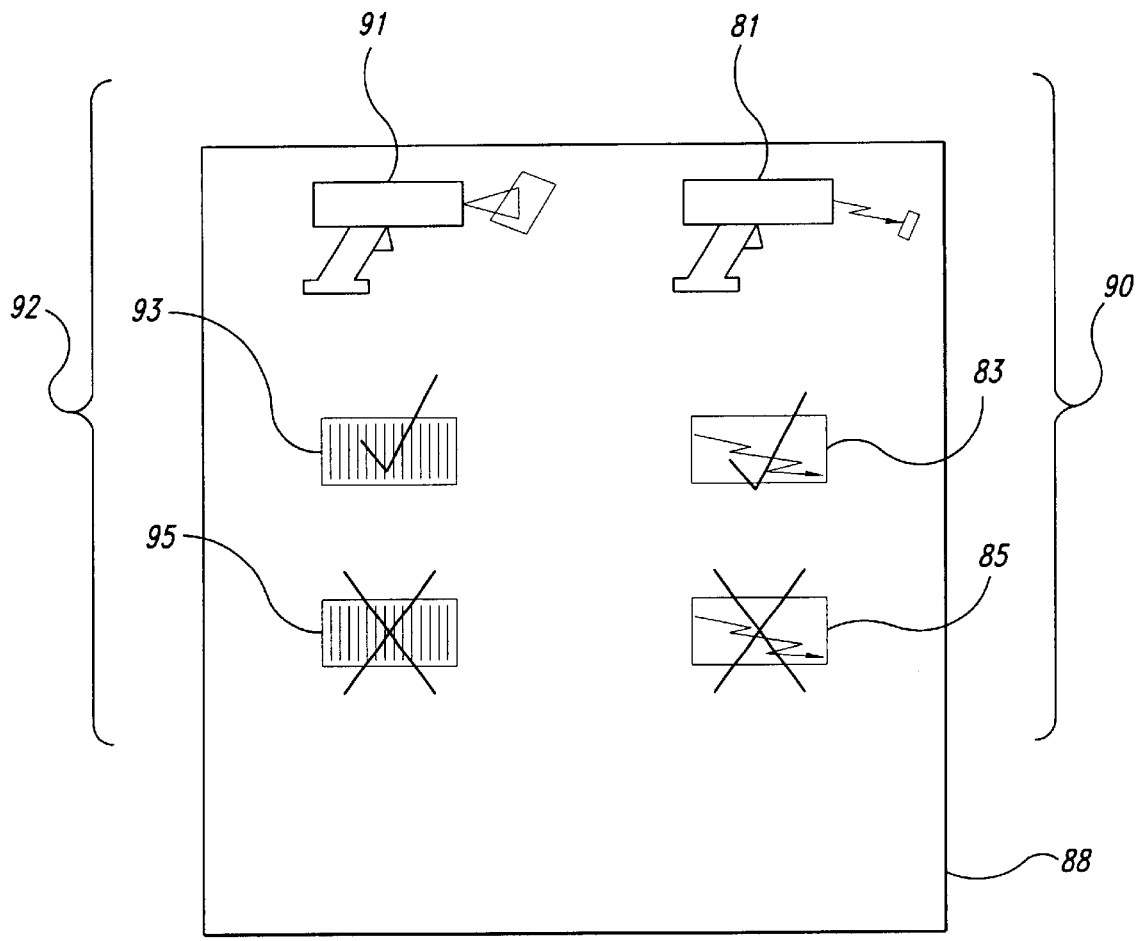
FIG. 6 is a top plan view of a graphic display of the reader of FIG. 3.

The display 74 can additionally, or alternatively, provide the user other visual indications. For example, a graphical display 88 (FIG. 6), can employ a first set of icons 90 to indicate RFID tag activities and a second set of icons 92 to indicate symbol reading activities. (Note, typically only a single icon will be displayed at a time, although multiple icons are shown in FIG. 6 for the convenience of this description.) For example, screen icons 81, 83 and 85 can represent RFID reading, successful reading of the RFID tag 12A, 12B, and unsuccessful reading of RFID tag 12A, 12B, respectively. Similarly, screen icons 91, 93 and 95 can represent machine-readable symbol reading, successful reading of the machine-readable symbol 24A, 24B, and unsuccessful reading of the machine-readable symbol 24A, 24B, respectively.

Figure 7:
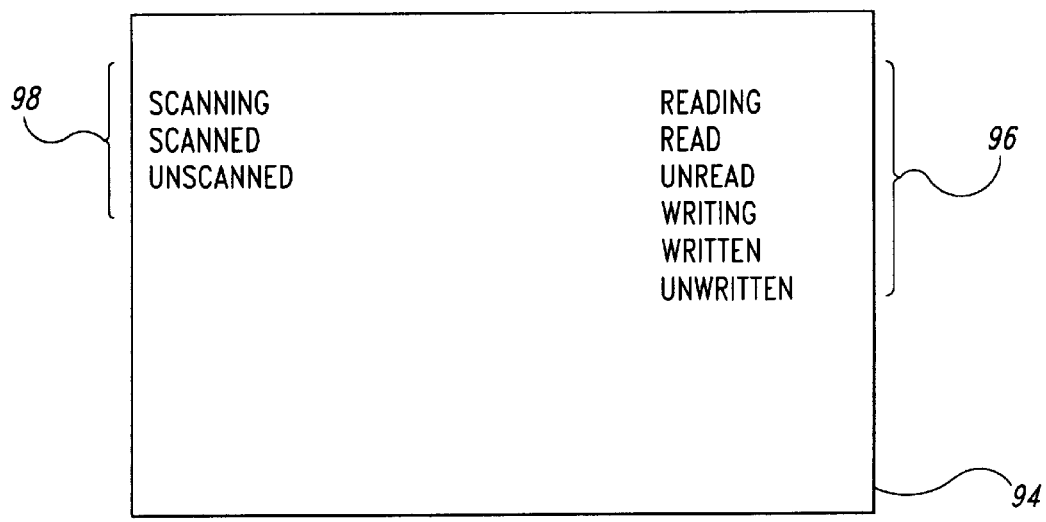
FIG. 7 is a top plan view of an alpha-numeric display of the reader of FIG. 3.

Similarly, an alpha-numeric display 94 (FIG. 7) can employ a first set of words 96 to indicate RFID tag activities and a second set of words 98 to indicate symbol reading activities. (Again, typically only a single word will be displayed at a time, although multiple are shown in FIG. 7 for the convenience of this description.) The display 94 is self-explanatory and in the interest of brevity will not be further described. Other visual indications, as well as audio and tactile indications are of course possible.

Selected Methods of Operation

Different methods of operating the reader 10 or a reader having similar capabilities are disclosed below. As set out in the below methods, the intuitive and consistent operation of the user interface within and across operating modes can provide numerous benefits. While several methods are set out for illustration, other methods employing similar techniques are within the scope of the invention. Also, the following descriptions employ certain descriptions of user outputs (e.g., Beep, Click, Red LED, Yellow LED, and Green LED) for convenience of description. Those skilled in the art will appreciate that other sounds, colors, visual, tactile indications, and/or other human-perceptible indications could be used.

Single Tag Read Mode

Figure 8:
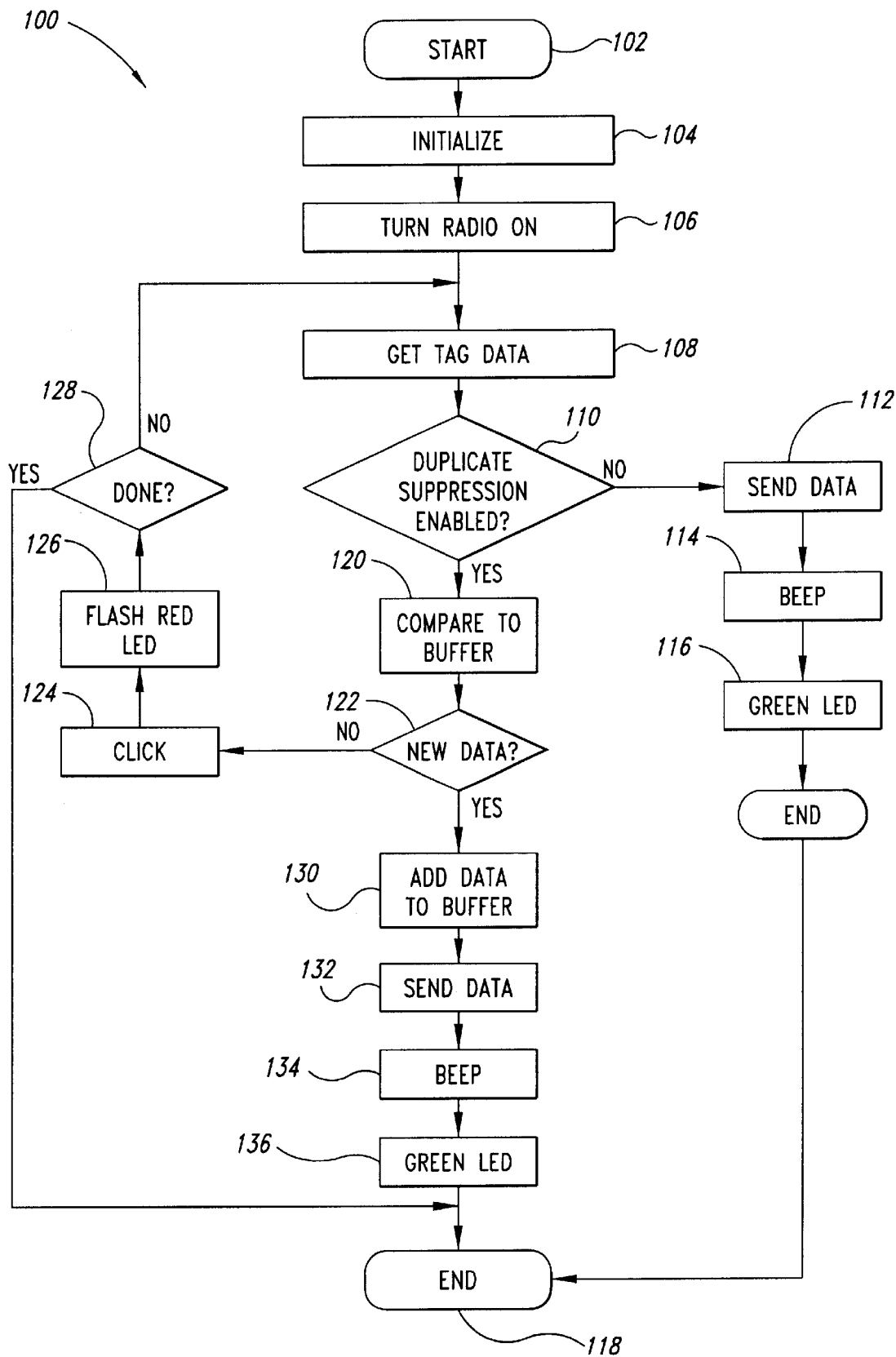
FIG. 8 is a flowchart showing a method of reading single RFID tags.

FIG. 8 shows a method 100 of reading RFID tags 12A–12B (FIG. 1) employing the reader 10 (FIGS. 1–3). Turning on the reader 10, or switching into the RFID tag reading mode, can automatically cause the microprocessor 46 to start the method 100 in step 102. Alternatively, or additionally, the user can cause the microprocessor 46 to start the RFID tag reading method 100 by selecting an appropriate key from the keypad 60 or icon from the display 74. Upon starting in step 102, the microprocessor 46 can perform an initialization process, for example loading appropriate operating instructions from the ROM 50 to the RAM 48, initializing the characteristic data string buffer 49 and/or performing a series of systems checks on the various component and subsystems of the reader 10, as set out in step 104.

Under the instructions loaded in the RAM 48, the microprocessor 46 activates the radio 44 in step 106. In step 108, the radio 44 receives data from the RFID tags 12A, 12B. The radio 44 can emit an interrogation signal to cause the RFID tags 12A, 12B to respond, or, the radio 44 can simply receive signals from RFID tags 12A, 12B that emit signals without interrogating the RFID tags. A variety of passive, active and hybrid RFID tags 12A, 12B are known in the art and will not be discussed in further detail. A discussion of RFID tags can be found in commonly assigned patent applications: U.S. Ser. No. 09/173,539, filed Oct. 15, 1998, entitled WIRELESS MEMORY DEVICE AND METHOD OF MANUFACTURE (Atty. Docket No. 480062.630); U.S. Ser. No. 09/164,203, filed Sep. 30, 1998, entitled MEMORY TAG AND METHOD OF MANUFACTURE (Atty. Docket No. 480062.632); U.S. Ser. No. 09/173,137, filed Oct. 15, 1998, entitled RF TAG HAVING STRAIN RELIEVED STIFF SUBSTRATE AND HYDROSTATIC PROTECTION FOR A CHIP MOUNTED THERETO (Atty. Docket No. 480062.635); and U.S. Ser. No. 09/164,200, filed Sep. 30, 1998, entitled CHIP PLACEMENT ON SMART LABELS (Atty. Docket No. 480062.642).

In step 110, the microprocessor 46 determines whether duplicate tag data should be suppressed. If suppressed, previously read or acquired data will not be stored or reported a second time. Suppression can be a user selection, or can be a selection transferred from the host 23, or can be preset, for example by the reader manufacturer or owner. If suppression is not active, the reader 10, in step 112, automatically transmits the read data, for example to the host 23, and provides an indication to the user that the data has been received and transmitted. To provide the indication, the reader 10 activates the speaker 66 to emit a single "beep" and activates the Green RFID related LED 76 for a short time, in steps 114, 116, respectively. Control passes to an end of the routine 100, in step 118.

If suppression is active, the microprocessor 46, compares a characteristic data string from the received data to other characteristic data strings stored in the characteristic data string buffer 49, in step 120. The characteristic data string can be any string of characters stored in the RFID tags 12A, 12B that permit the reader 10 to determine whether a particular RFID tag 12A, 12B has been read more than once. For example, the characteristic data string can be a unique identifier programmed into each of the RFID tags 12A, 12B. Alternatively, the characteristic data string can be the entire set of data stored in the RFID tag 12A, 12B, or can be any subset or field of data recognizable by position, offset, delimiter or other such field identifier. The microprocessor 46 branches at step 122 based on the determination of whether the received characteristic data string corresponds, or matches, any of the stored data strings.

If the received characteristic data string corresponds to, or matches, any of the stored characteristic data strings, the reader 10 provides an indication that the RFID tag 12A, 12B has been read again, activating the speaker 66 to emit a single "click" and activating or "flashing" the Red RFID related LED 84 in steps 124, 126, respectively. The microprocessor 46 determines in step 128, if the reader 10 is finished reading RFID tags 12A, 12B, as described in detail below.

If the received characteristic data string does not correspond to, or match any of the stored data strings, the microprocessor 46 updates the characteristic data string buffer 49 containing the read characteristic data strings, for example storing the newly received characteristic data string to the buffer 49 in step 130. The reader 10 can automatically transmit the read data in step 132, for example to the host 23 (FIG. 1). The reader 10 also provides an indication that a new RFID tag 12A, 12B has been read (e.g., read for the first time since the buffer 49 was initialized), activating the speaker 66 to emit a "beep" in step 134 and activating the Green RFID related LED 76 in step 136. Control passes to the end of the routine 100 in step 118.

Figure 9:
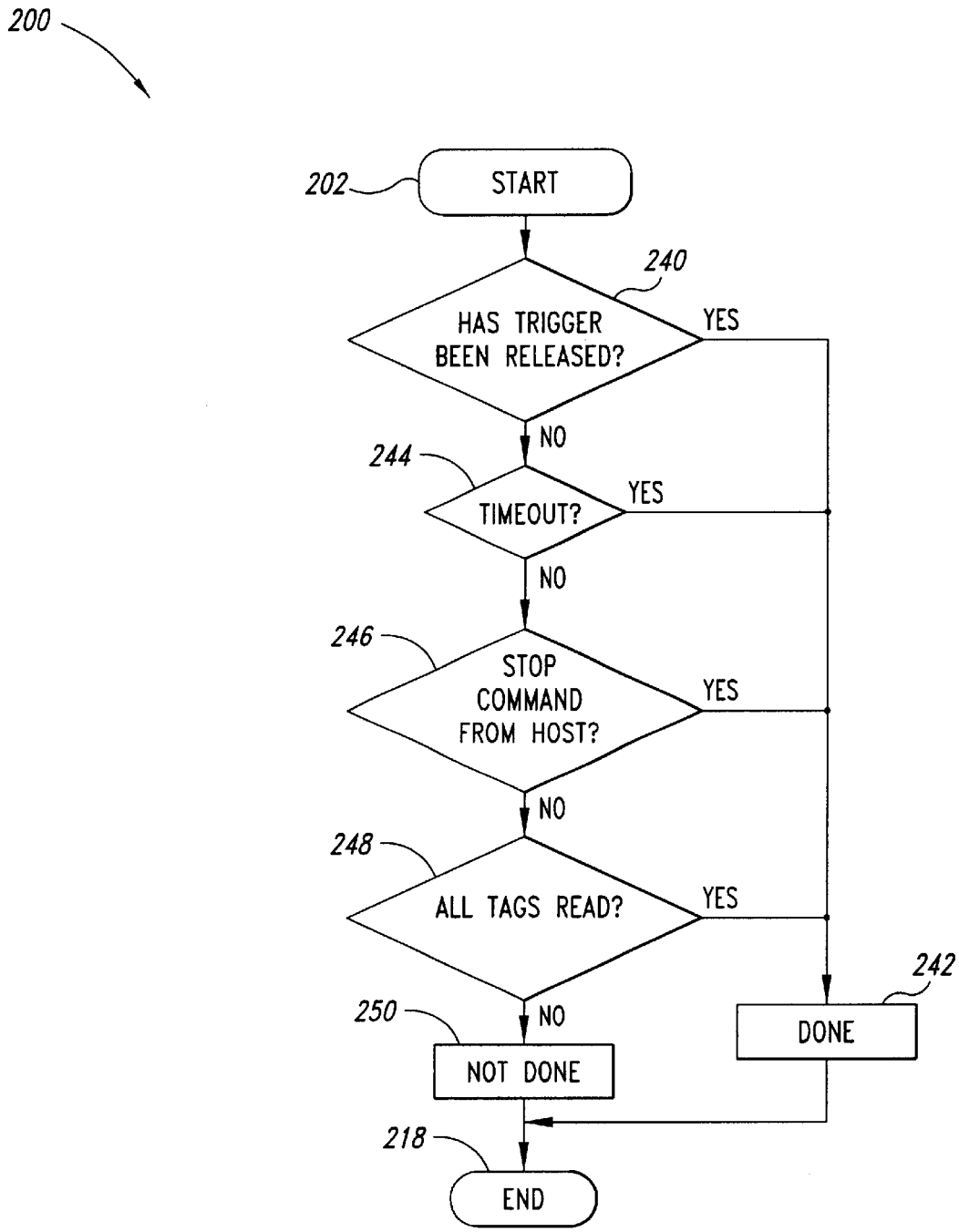
FIG. 9 is a flowchart showing a method of determining when a reader is finished reading RFID tags.

FIG. 9 is a flowchart of a method 200 of determining when a reader 10 is finished reading. The microprocessor 46 can execute this method 200 in place of each step labeled "DONE" in the various other methods, such as at step 128 of FIG. 8 (discussed above), or in the other Figures (discussed below). As set out in the Figures, the method 200, starting at step 202, acts as a function or subroutine, returning a Boolean value (e.g., TRUE/FALSE, YES/NO, or DONE/NOT DONE conditions). While the method 200 could be implemented as an integral part of the other methods discussed herein, it is set out separately for ease of discussion.

At step 240, the microprocessor 46 determines whether the trigger 20 has been released. A trigger release indicates that the user is finished reading. If the trigger 20 has been released, the microprocessor 46 sets the Boolean value to "DONE" at step 242, and passes control to an end of the routine 200 at step 218, returning the appropriate Boolean value. For example, when returning to the method 100 (FIG. 8), the condition "DONE" can cause the reader 10 to stop interrogating RFID tags 12A, 12B.

If the trigger 20 has not been released, the microprocessor 46 in step 244 determines whether a timeout condition has been exceeded. For example, the reader 10 can assume that all RFID tags 12A, 12B have been read if a new (e.g., not previously read) tag is not found after some length of time or some number of consecutive repeatedly read RFID tags 12A, 12B. While the length of time or number of repeated reads can be preset, the length or number of repeats can also be determined during the reading, for example as a function of RFID tag density (e.g., number of RFID tags per unit time). The microprocessor 46 can rely on an internal clock or a separate clock circuit (not shown) in measuring the timeout period. Employing RFID tag density to calculate the stopping condition "on the fly" reduces the likelihood of ending a search prematurely.

If the timeout condition is exceeded, the reader 10 considers reading to be finished, sets the Boolean value to "DONE" at step 242, and passes control to the end of the method 200 at step 218, producing the appropriate Boolean value for determining the next operation, such as turning the radio OFF. If the timeout condition is not exceeded, the microprocessor 46 determines whether a stop command has been received from the host 23 in step 246. If a stop command has been received, the Boolean value is again set to "DONE" at step 242, and control passes to the end of the method 200 at step 218. If a stop command has not been received from the host 23, the microprocessor 46 at step 248, determines whether all RFID tags 12A, 12B have been read. If all RFID tags 12A, 12B have been read, the Boolean value is set to "DONE" at step 242 and control passes to the end of the method 200 at step 218, returning the appropriate response. If all RFID tags 12A, 12B have not been read, the Boolean value is set to "NOT DONE" at step 250 and control passes to the end 218, thereby returning the appropriate Boolean value.

Multi Tag Read/Write Modes

Figure 10:
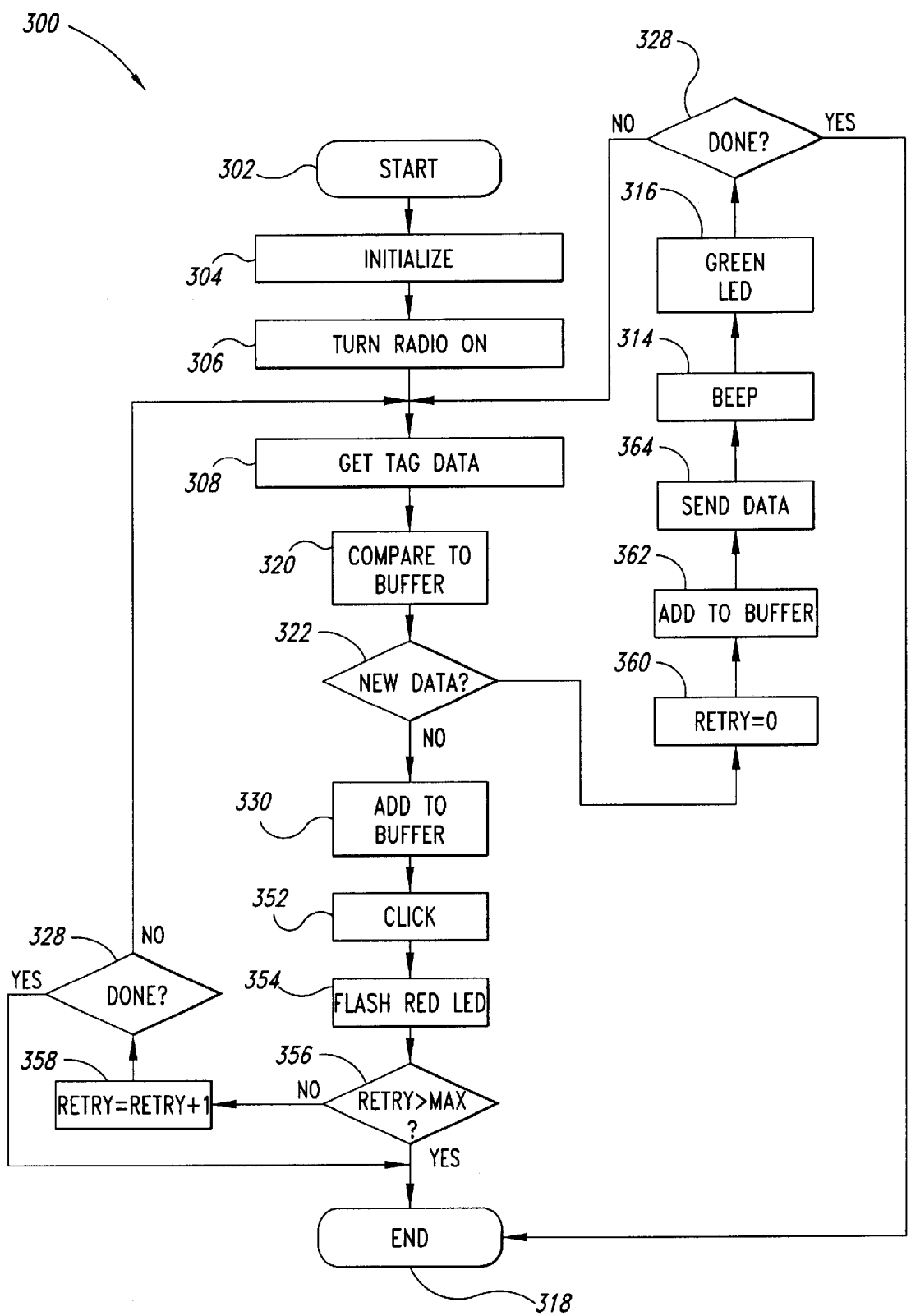
FIG. 10 is a flowchart showing a method of reading multiple RFID tags.

FIG. 10, shows an additional, or alternative embodiment of operating under the present invention. Similar steps in the methods are assigned reference numerals that have the two least significant digits in common (e.g., the "Start" step is respectively numbered: 102, 202, 302, . . . , 702 in FIGS. 6–12, respectively).

FIG. 10 shows a method 300 of reading multiple RFID tags 12A, 12B (FIG. 1) employing the reader 10 (FIGS. 1–3). In a similar fashion to the method 100, the microprocessor 46 starts executing the method 300 at step 302, initializing the reader 10 at step 304, turning ON the radio 44 in step 306, and receiving responses from the RFID tags 12A, 12B in step 308. In step 320, the microprocessor 46 compares a characteristic data string from the received data to other characteristic data strings stored in the characteristic data string buffer 49 to determine whether the reader 10 has read the particular RFID tag 12A, 12B before. The microprocessor 46 branches at step 322 based on the determination of whether the received characteristic data string corresponds, or matches, any of the stored data strings.

If the received characteristic data string corresponds to, or matches, any of the stored characteristic data strings, the microprocessor 46 adds the read characteristic data string to the characteristic data string buffer 49, at step 330. The reader 10 provides an indication that the read RFID tag 12A, 12B has been previously read, activating the speaker 66 to emit a single "click" and activating or "flashing" the Red RFID related LED 84 at steps 352 and 354, respectively. In step 356, the microprocessor 46 examines a counter ("Retry") to determine whether a maximum number of iterations has been exceeded without finding a "new" (e.g., not previously read) RFID tag 12A, 12B. If the number of iterations without encountering a new RFID tag 12A, 12B has been exceeded, control passes to an end of the method 300 at step 318. If the number of iterations without encounter a new RFID tag 12A, 12B has not been exceeded, the microprocessor 46 increments the Retry counter in step 358, and determines in step 328 whether the reader 10 is finished reading RFID tags 12A, 12B, as described in detail above with respect to method 200 (FIG. 9). The microprocessor 46 returns to receiving RFID tag responses in step 308, or passes control to the end of the method 300 at step 318 based on the Boolean value returned by the method 200 (FIG. 9).

If the received characteristic data string does not correspond to, or match any of the stored data strings, the microprocessor 46 resets the Retry counter in step 360, and adds the read characteristic data string to the characteristic data string buffer 49 in step 362. The reader 10 in step 364, automatically transmits the read data, for example to the host 23. The reader 10 also provides an indication that a new RFID tag 12A, 12B has been read (e.g., read for the first time since the buffer 49 was initialized), activating the speaker 66 to emit a "beep" in step 314 and activating the Green RFID related LED 76 in step 316. The microprocessor 46 determines in step 328 whether the reader 10 is finished reading RFID tags 12A, 12B, as described in detail above with respect to method 200 (FIG. 9). The microprocessor 46 returns to receiving RFID tag responses in step 308 or passes control to the end of the method 300 in step 318 based on the condition returned by the method 200.

The data carrier reader 10 can employ a method that includes operating a radio 44 in the RFID tag interrogator 30 to write to an RFID tag 12A, 12B; and producing a first human-perceptible indication after writing to the RFID tag 12A, 12B. The method can also include receiving a confirmation signal from the RFID tag 12A, 12B prior to producing the first human-perceptible indications. Further, the method can include writing to a number of other RFID tags 12A, 12B; producing the first human-perceptible indication after writing to each of the other RFID tags 12A, 12B; and producing a second human-perceptible indication after writing to all of the RFID tags 12A, 12B. Thus, the method can also include comparing a respective characteristic data string of each of the RFID tags 12A, 12B to a set of identifiers stored in a memory to determine whether all of the RFID tags 12A, 12B have been written. Alternatively, the method can include writing to a number of other RFID tags 12A, 12B; producing the first human-perceptible indication after writing to each of the RFID tags 12A, 12B; comparing a respective characteristic data string of each of the RFID tags 12A, 12B to a set of identifiers stored in a memory to determine if the RFID tag 12A, 12B has been previously written; and producing a second human-perceptible indication after the number of successive repeatedly written RFID tags 12A, 12B exceeds a maximum number of repeated writes. The method can further include ceasing to power the radio 44 after writing to the RFID tag 12A, 12B.

Inclusive Search

Figure 11:
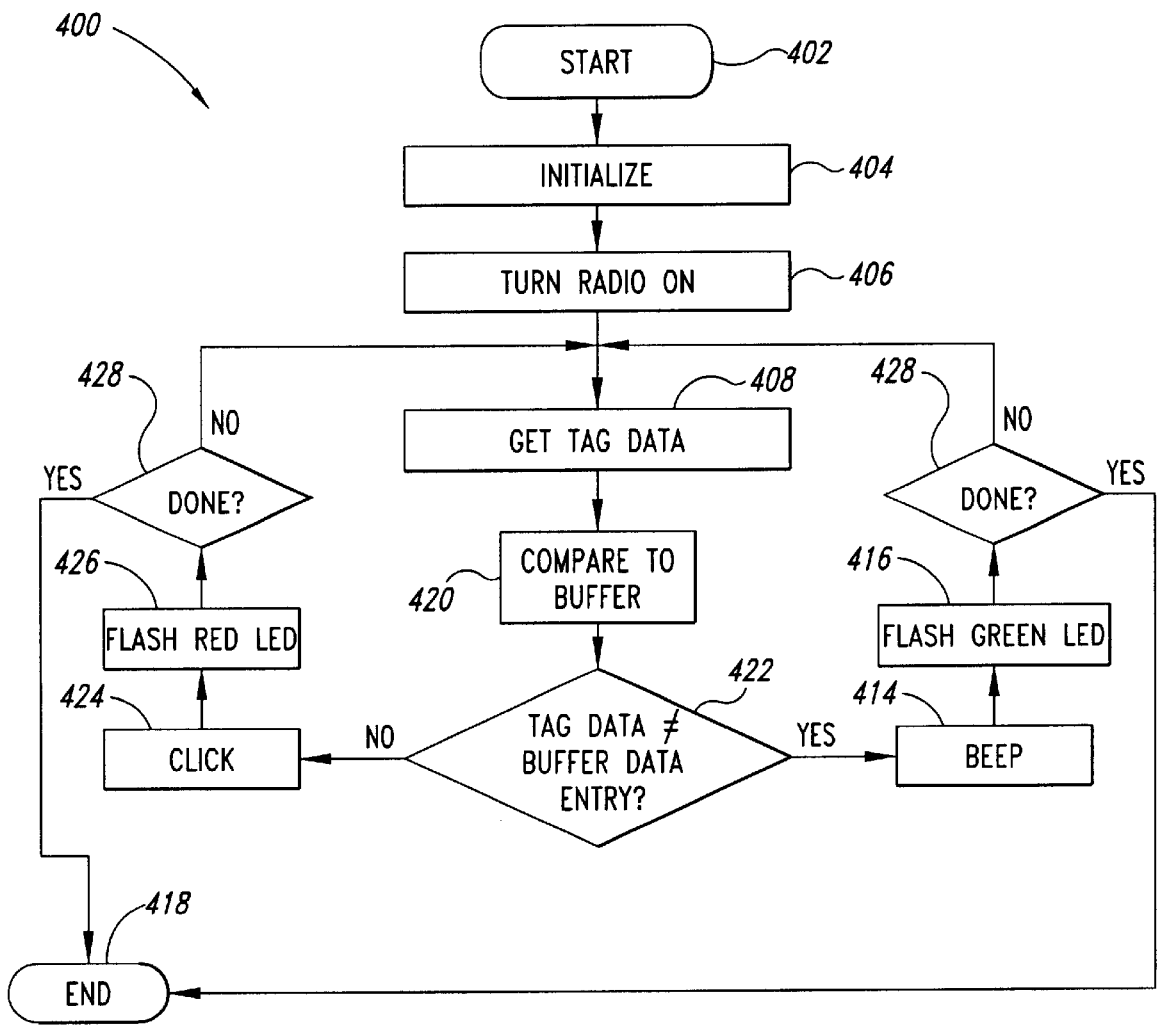
FIG. 11 is a flowchart showing a method of performing an inclusive search of RFID tags.

The reader 10 can perform an "inclusive" search, such as finding all RFID tags 12A, 12B on a list of RFID tags 12A, 12B. FIG. 11 shows a method 400 for performing an inclusive search. The user can start the inclusive search 400 by, for example, selecting an appropriate key or icon as in step 402. The microprocessor 46 performs an initialization at step 404, for example loading a list of characteristic data strings for the RFID tags 12A, 12B to be located or identified into the characteristic data string buffer 49. The list of characteristic data strings can, for example, be downloaded from the host 23 via interface 22. The microprocessor 46 turns ON the radio 44 at step 406.

In step 408, the radio 44 interrogates the RFID tags 12A, 12B to receive response signals containing the respective characteristic data strings. Alternatively, the radio 44 can receive the response signals without interrogating if the RFID tags 12A, 12B are active and periodically transmit data without requiring initiation by an interrogation signal. In step 420, the microprocessor 46 compares the received characteristic data string with the characteristic data strings stored in the characteristic data string buffer 49. The microprocessor 46 branches at step 422, based on the determination of whether the received characteristic data string corresponds, or matches, any of the stored data strings.

If the read characteristic data string corresponds to, or matches any of the stored characteristic data strings, then one of the RFID tags 12A, 12B has been found and the reader 10 reports such to the user and/or host 23. The reader 10 provides the user indication by activating the speaker 66 to "beep" in step 414 and activating or "flashing" the Green RFID related LED 76 in step 416. If the read characteristic data string does not correspond to, or match any of the stored characteristic data strings, then one of the RFID tags 12A, 12B has not been found, and the reader 10 reports such to the user, and/or host 23. The reader 10 provides the user indication by activating the speaker 66 to "click" in step 424 and activating or "flashing" the Red RFID related LED 84 in step 426.

After providing the user indications, the microprocessor determines whether the reader is finished reading, in step 428. If the reading is finished, the returned Boolean value (i.e., DONE) causes control to pass to an end of the inclusive search routine 400 in step 418. If the reading is not finished, the returned Boolean value (i.e., NOT DONE) causes the radio 22 to continue receiving response signals, passing control to step 418.

Exclusive Search

Figure 12:
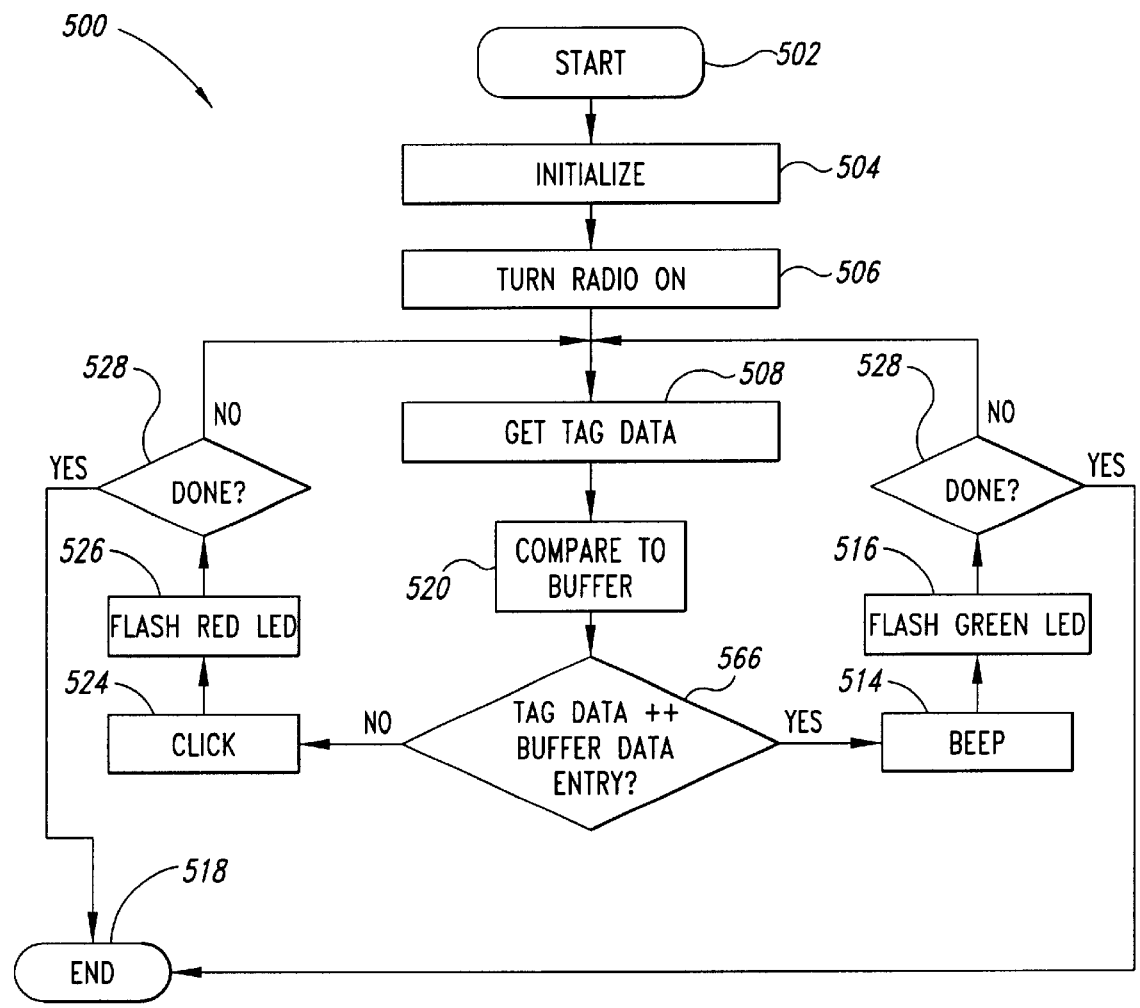
FIG. 12 is a flowchart showing a method of performing an exclusive search of RFID tags.

The reader 10 can perform an "exclusive" search, such as finding any RFID tags 12A, 12B not on a list of RFID tags 12A, 12B. FIG. 12 shows a method 500 for performing an exclusive search. The user can start the exclusive search 500 at step 502 by, for example, selecting an appropriate key or icon. The microprocessor 46 performs an initialization at step 504, for example loading a list of characteristic data strings for the RFID tags 12A, 12B to be located. At step 506, the microprocessor turns ON the radio 44.

In step 508, the radio interrogates the RFID tags 12A, 12B to receive response signals containing the respective characteristic data strings. Alternatively, the radio can receive the response signals without interrogating if the RFID tags 12A, 12B are active and periodically transmit without requiring an interrogation signal. In step 520, the microprocessor 46 compares the received characteristic data string with the characteristic data strings stored in the characteristic data string buffer 49. The microprocessor 46 branches at step 566, based on the determination of whether the received characteristic data string does not correspond, or match, any of the stored data strings.

If the read characteristic data string does not correspond to, or match any of the stored characteristic data strings, then one of the RFID tags 12A, 12B missing from the list has been found, and the reader 10 reports such to the user and/or host 23. The reader 10 provides the user indication by activating the speaker 66 to "beep" in step 514, and activating or "flashing" the Green RFID related LED 76 in step 516. If the read characteristic data string corresponds to, or matches any of the stored characteristic data strings, then one of the RFID tags 12A, 12B missing from the list has not been found, and the reader 10 reports such to the user, and/or host 23. The reader 10 provides the user indication by activating the speaker 66 to "click" in step 524, and activating or "flashing" the Red RFID related LED 84 in step 526.

After providing the user indications, the microprocessor 46 determines whether the reader 10 is finished reading, in step 528. If the reading is finished, the returned Boolean value (i.e., DONE) causes control to pass to an end of the exclusive search routine 500 in step 518. If the reading is not finished, the returned Boolean value (i.e., NOT DONE) causes the radio to continue receiving response signals, passing control to step 508.

Association of RFID Tag Data With Item Using Machine-Readable Symbol

Often a user desires to make a physical association between the data read from one of the RFID tags 12A, 12B and a particular object or item 14 (FIG. 1). While the RFID tag 12A, 12B may be attached to, or contained with the item, it can be difficult to identify the particular RFID tag 12A, 12B that is being read. For example, trying to identify one or more bags in a cargo hold, or cargo container on an airliner is difficult and time consuming using only RFID tags 12A, 12B. Each bag would have to be isolated and the RFID tag 12A, 12B read to ensure that the read data came from the RFID tag 12A, 12B associated with the particular bag. At least one proposed solution involves placing human-perceptible indicators on each of the RFID tags, as disclosed in the commonly assigned U.S. patent application Ser. No. 09/249,359, filed Feb. 12, 1999, entitled, "METHOD AND APPARATUS FOR HUMAN-PERCEPTIBLE IDENTIFICATION OF MEMORY DEVICES, SUCH AS RFID TAGS". This solution can be relatively expensive since each RFID tag 12A, 12B requires its own human-perceptible indicator which complicates RFID tag manufacture.

Figure 13:
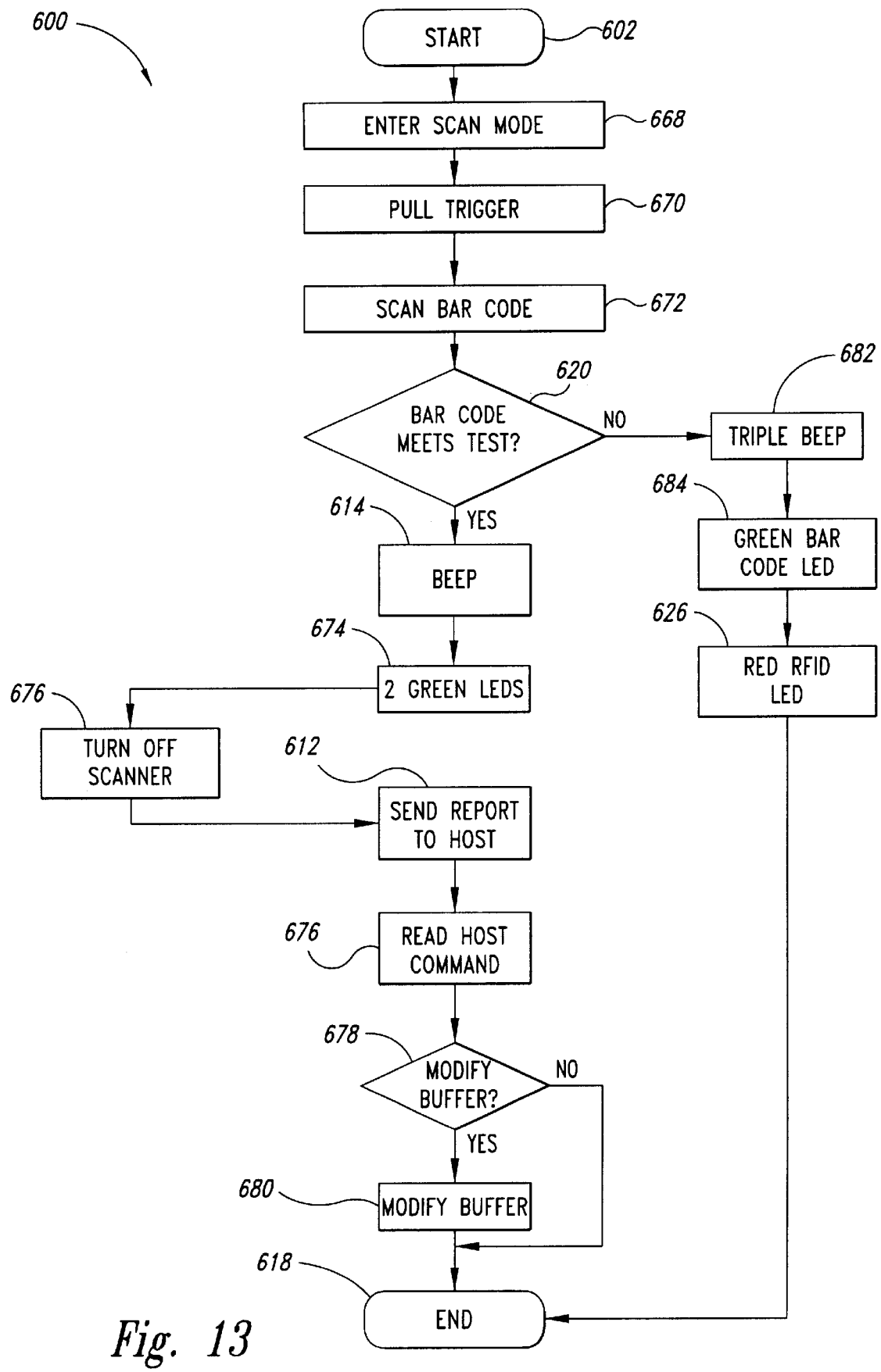
FIG. 13 is a flowchart showing a method of associating data from an RFID tag with an item using a machine-readable symbol.

FIG. 13 shows a method 600 of associating the read data from the RFID tag 12A, 12B with a particular one of the items 14. The association method 600 assumes that an RFID tag 12A, 12B has already been read, a characteristic data string retrieved and stored, for example, in the characteristic data string buffer 49. The user can start the association method 600 in step 602, as discussed generally above. Alternatively, the reader 10 can be configured to automatically start the association method 600 at step 602. In step 668, the microprocessor 46 enters the symbol reading mode. The user activates the trigger 20 in step 670, causing the microprocessor 46 to activate the image sensor 52 to read the machine-readable symbol 24A, 24B at which the reader 10 is directed. In step 672, the image sensor 52 acquires data from the machine-readable symbol 24A, 24B by scanning, digitizing, or by any commonly known methods in the relevant art. As part of acquiring the data, the microprocessor 46, or a dedicated processor (not shown), decodes the image to acquire a characteristic data string encoded in the machine-readable symbol 24A, 24B. Methods and apparatus for acquiring data from machine-readable symbols are commonly known in the art, and are specifically taught in *The Bar Code Handbook* 3$^{rd}$ Ed, by Palmer, Roger C, Helmers Publishing, Inc. (ISBN 0-911261-09-5), and, in the interest of brevity, will not be described in further detail.

To determine whether the machine-readable symbol 24A, 24B that the reader 10 is pointing at is associated with the RFID tag data read by the reader 10, the microprocessor 46 compares a characteristic data string read from the RFID tag 12A, 12B with the characteristic data string read from the machine-readable symbol 24A, 24B, in step 620. The user can visually associate the RFID tag 12A, 12B with the machine-readable symbol 24A, 24B since the RFID tag 12A includes the machine-readable symbol 24A, or the RFID tag 12B and machine-readable symbol 24B are carried by the same item 14, or can be visually associated is some other manner. The user can therefore determine that the data is from a particular RFID tag 12A, 12B when a match is indicated by the reader 10.

If the characteristic data string from the machine-readable symbol 24A, 24B corresponds to, or matches, the characteristic data string from the RFID tag 12A,12B, the reader 10 provides an indication that an association exists. To provide the indication, the microprocessor 46 activates the speaker 66 to emit a single "beep" in step 614 and activates or "flashes" the Green RFID related LED 76 and the Green symbol related LED 78 in step 674. The RFID related and the symbol related LEDs 76, 78 are each activated, indicating that both an RFID tag 12A, 12B and a machine-readable symbol 24A, 24B have been located, providing a consistency across the user interface.

In step 676, the microprocessor 46 can turn OFF the image sensor 52 after having found an association. In step 612, the reader 10 can report the data, for example transmitting the RFID data to the host 23 via the communications port 38 and interface 22. In step 676, the reader 10 can receive a direction or command from the host 23 via the interface 22 and the communications port 38. In step 678, the microprocessor 46 determines whether the buffer should be modified based on the command from the host 23. If the buffer is to be modified, the microprocessor 46 modifies the buffer at step 680, and passes control to an end of the association method 600 in step 618. Otherwise, the microprocessor 46 passes control directly to the end of the association method, in step 600, without modifying the buffer.

If the characteristic data string from the machine-readable symbol 24A, 24B does not correspond to, or match the characteristic data string from the RFID tag 12A, 12B, the reader 10 provides an indication that an association does not exist. To provide the indication, the microprocessor 46 activates the speaker 66 to emit a three "Beeps" in step 682, and activates or "flashes" the Red RFID related LED 84 and the Green symbol related LED 78 in steps 626, 684, respectively. The Green symbol related LED 78 is flashed to indicate that a symbol has been successfully read, while the Red RFID related 84 is flashed to indicate that the data is not associated with the machine-readable symbol 24A, 24B, further providing consistency across the user interface. The microprocessor 46 proceeds to the end of the method 600, in step 618.

Figure 14:
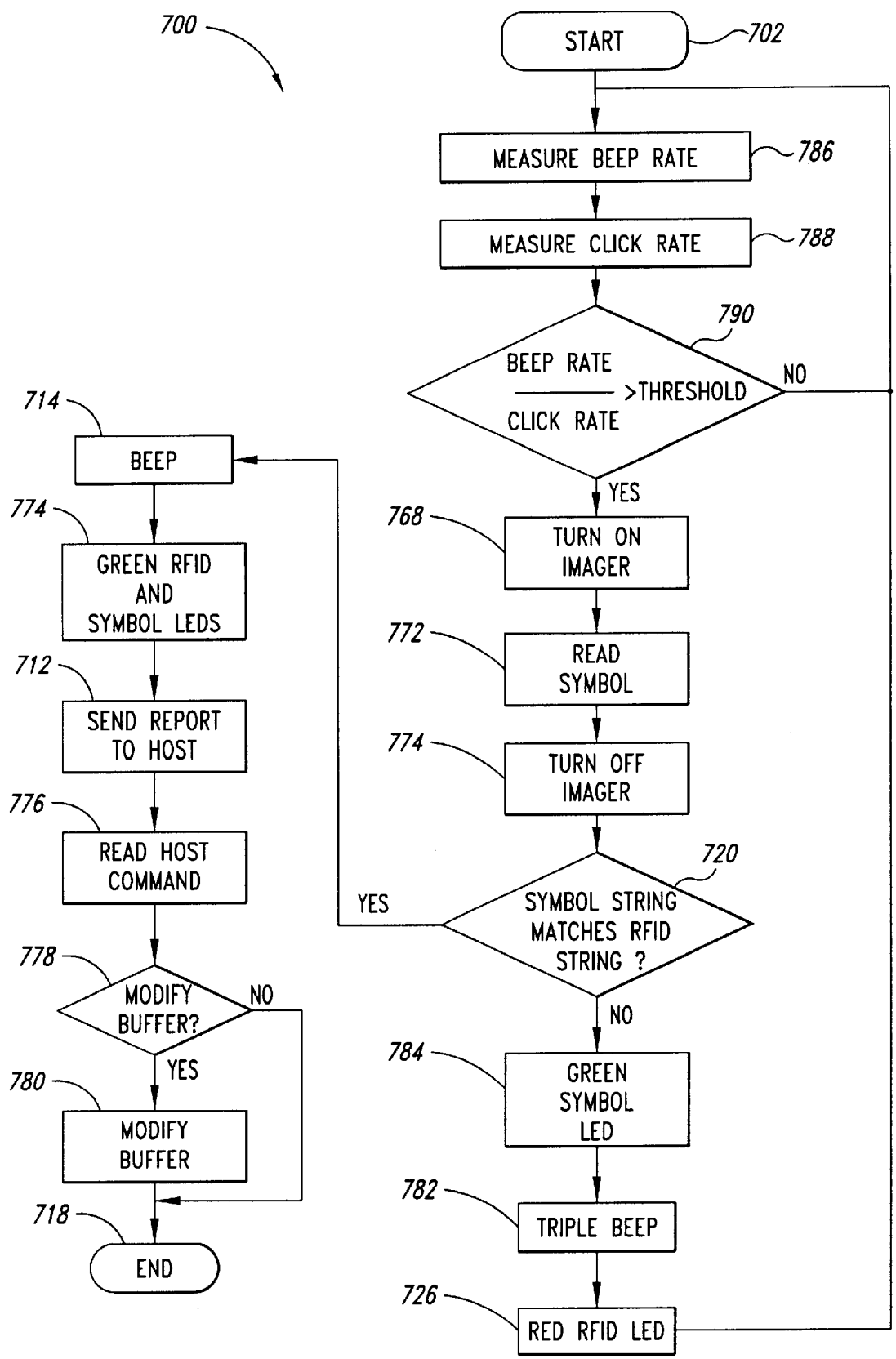
FIG. 14 is a flowchart showing a method of automatically imaging a machine-readable symbol based on proximity to an RFID tag to associate data from an RFID tag with an item using the machine-readable symbol.

Automatically Reading A Symbol Based On Proximity To RFID Tag, or Frequency of RFID Tag's Responses FIG. 14 shows a method 700, in which the reader 10 automatically reads the machine-readable symbol when the reader 10 is within a defined proximity of the RFID tag 12A, and hence within the defined proximity of the machine-readable symbol 24A. The automated symbol reading feature provides numerous benefits, for example the automated symbol reading feature can simplify operation of the reader, and/or reduce the probability of user error. The automated symbol reading feature can also reduce the amount of labor required to operate the reader 10, and can even eliminate the need for a human operator. The method 700 of FIG. 14 can be used as part of, or with, many of the previously described methods.

The antenna 42 in the reader 10 can be directionally sensitive. The directionally sensitive antenna 42 has a directional range, in other words, the antenna is more sensitive in certain directions than other directions. As the reader 10 approaches a particular RFID tag 12A, 12B, that RFID tag 12A, 12B spends a higher percentage of time within the range of the reader 10. In contrast, other RFID tags 12A, 12B are in the range a lower percentage of time. Thus, as the reader 10 comes within a predefined proximity of the RFID tag 12A, 12B, the number of "hits" (i.e., reading an RFID tag having a desired characteristic data string) will increase, and the number of "misses" (i.e., reading RFID tags not having the desired characteristic data string) will decrease. The user may recognize this from an increase in the number of "Beeps" and a decrease in the number of "Clicks" emitted by the reader 10. The microprocessor 46 in the reader 10, can keep track of the number of hits and the number of misses for some unit length of time, steps 786, 788, respectively. The microprocessor 46 can determine a ratio of the number of hits per unit of time and the number of misses per unit of time. Alternatively, the host 23 can process the same information.

In step 790, the microprocessor 46 determines whether the ratio of hits to misses exceeds a symbol reading threshold. If the ratio does not exceed the symbol reading threshold, the microprocessor 46 returns to step 786 and the reader 10 continues to read the RFID tags 12A, 12B, continually revising and checking the ratio against the threshold.

If the ratio exceeds the symbol reading threshold, the microprocessor 46 turns the image sensor 52 ON, for example, switching from the RFID reading mode to the symbol reading mode in step 768. The microprocessor 46 controls the image sensor 52 to image and decode the machine-readable symbol 24A, 24B in 772. In step 774, the microprocessor 46 turns the image sensor 52 OFF, thereby conserving power. In step 720, the microprocessor 46 compares the characteristic data string from the machine-readable symbol 24A, 24B to the characteristic data string from the RFID tag 12A, 12B.

If the characteristic data string from the machine-readable symbol 24A, 24B corresponds to, or matches, the characteristic data string from the RFID tag 12A,12B, the reader 10 provides an indication that an association exists. To provide the indication, the microprocessor 46 activates the speaker 66 to emit a single "Beep" in step 714 and activates or "flashes" the Green RFID related LED 76 and the Green symbol related LED 78 in step 774. The RFID related and the symbol related LEDs 76, 78 are each activated, indicating that both an RFID tag 12A, 12B and a machinereadable symbol 24A, 24B have been located, providing a consistency across the user interface.

In 712, the reader 10 can report the data, for example automatically transmitting the RFID data to the host 23 via the communications port 38 and interface 22. In step 776, the reader 10 can receive a direction or command from the host 23 via the interface 22 and the communications port 38. In step 778, the microprocessor 46 determines whether the characteristic data string buffer 49 should be modified based on the command from the host 23. If the buffer 49 is to be modified, the microprocessor 46 modifies the buffer at step 780, and passes control to an end of the association method 700 at step 718. Otherwise, the microprocessor 46 passes control directly to the end of the association method 700 at step 718 without modifying the characteristic data string buffer 49.

If the characteristic data string from the machine-readable symbol 24A, 24B does not correspond to, or match the characteristic data string from the RFID tag 12A, 12B, the reader 10 provides an indication that the association does not exist. The microprocessor 46 activates the speaker 66 to emit three "Beeps" in step 782, and activates or "flashes" the Green symbol related LED 78 and the Red RFID related LED 84 in steps 784 and 726, respectively. The Green symbol related LED 78 is flashed to indicate that a symbol has been successfully read, while the Red RFID related 84 is flashed to indicate that the data is not associated with the machine-readable symbol 24A, 24B, further providing consistency across the user interface.

SUMMARY

The various embodiments described above can be combined to provide further embodiments. All of the above U.S. patents, patent applications and publications referred to in this specification are incorporated by reference. Aspects of the invention can be modified, if necessary, to employ systems, circuits and concepts of the various patents, applications and publications to provide yet further embodiments of the invention.

Although specific embodiments of and examples data carrier readers and reading are described herein for illustrative purposes, various equivalent modifications can be made without departing from the spirit and scope of the invention, as will be recognized by those skilled in the relevant art. The teachings provided herein of the invention can be applied to any data carrier reader, not necessarily the exemplary combination RFID tag and symbol reader generally described above.

For example, some of the structures and methods can be used with readers capable of reading only RFID tags. Some of the structures and methods can be used with readers capable of reading only machine-readable symbols. Some of the structures and methods can be suitable with readers for other data carriers, such as optical tags and touch memory devices. The methods and structures are generally applicable with other wireless memory devices, not just radio frequency, and the term RFID as used herein is meant encompass wireless memory devices operating in all ranges of the electromagnetic spectrum, not only the radio frequency portion. Similarly, the structures and methods disclosed can work with any variety of modulation techniques, including, but not limited to, amplitude modulation, frequency modulation, phase modulation and/or pulse width modulation. The structures and methods can also be applied to various machine-readable symbologies, including, but not limited to, bar codes, stacked codes, area and/or matrix codes. The image sensor 52 can be any type of image capture device, including laser scanners, one- and two-dimensional charged coupled devices, Vidicons, and the like.

These and other changes can be made to the invention in light of the above-detailed description. In general, in the following claims, the terms used should not be construed to limit the invention to the specific embodiments disclosed in the specification and the claims, but should be construed to include all apparatus and methods that operate in accordance with the claims. Accordingly, the invention is not limited by the disclosure, but instead its scope is to be determined entirely by the following claims.

We claim:

1. A method of operating a data carrier reader, comprising:

receiving a plurality of characteristic data strings from each of a number of RFID tags, including at least one RFID tag of interest;

comparing at least a portion of each of the received characteristic data strings to at least one identifier stored in a buffer, the identifier corresponding to the RFID tag of interest;

producing a first human-perceptible indication in response to the number of received characteristic data strings that correspond to the at least one identifier; and automatically operating a symbol reader when a rate of response corresponding to the at least one identifier exceeds a threshold value.

2. The method of claim 1, further comprising:

producing a second human-perceptible indication in response to the number of received characteristic data strings that do not correspond to the at last one identifier.

3. The method of claim 1, further comprising:

producing a second human-perceptible indication in response to the number of received characteristic data strings that do not correspond to the at last one identifier, wherein the first human-perceptible indication is a first sound and the second human-perceptible indication is a second sound, different from the first sound.

4. The method of claim 1, further comprising:

determining a hit rate of response corresponding to a number of received characteristic data strings that correspond to the at least one identifier;

determining a miss rate of response corresponding to the number of received characteristic data strings that do not correspond to the at least one identifier; and determining the threshold value from the hit rate of response and the miss rate of response.

5. The method of claim 1, further comprising:

reading a symbol; and comparing at least a portion of the read symbol to the at least one identifier stored in a buffer.

6. The method of claim 1, further comprising:

reading a symbol;

comparing at least a portion of the read symbol to the at least one identifier stored in a buffer; and automatically ceasing to power the symbol reader after reading the symbol.

7. The method of claim 1, further comprising:

reading a symbol;

comparing at least a portion of the read symbol to the at least one identifier stored in a buffer; and automatically transferring the characteristic data string read from the RFID tag of interest to a host if the at least a portion of the read symbol corresponds to the at least one identifier stored in a buffer.

8. A method of operating a data carrier reader, comprising:

receiving a plurality of responses from a number of RFID tags including at least one RFID tag of interest; and automatically operating a symbol reader when a rate of the responses from the RFID tag of interest exceeds a threshold rate of response.

9. The method of claim 8, further comprising:

producing a first human-perceptible indication corresponding to a number of the responses received from the RFID tag of interest.

10. The method of claim 8, further comprising:

producing a first human-perceptible indication corresponding to a number of the responses received from the RFID tag of interest; and producing a second human-perceptible indication in response to a number of the responses received from the RFID tags other than the RFID tag of interest.

11. The method of claim 8, further comprising:

determining the threshold rate of response from the ratio of the responses of the RFID tags other than the RFID tag of interest and the responses of the RFID tag of interest.

12. The method of claim 8, further comprising:

reading a symbol; and comparing at least a portion of the read symbol to at least a portion of at least one of the plurality of responses.

13. The method of claim 8, further comprising:

reading a symbol;

comparing at least a portion of the read symbol to at least a portion of at least one of the plurality of responses; and automatically ceasing to power the symbol reader after reading the symbol.

14. The method of claim 8, further comprising:

reading a symbol;

comparing at least a portion of the read symbol to at least a portion of at least one of the plurality of responses; and automatically transferring at least a portion of the response received from the RFID tag of interest to a host if the at least a portion of the read symbol corresponds to the at least a portion of the at least one of the plurality of responses.

* * * * *